(12) United States Patent
Park et al.

(10) Patent No.: US 8,532,671 B2
(45) Date of Patent: Sep. 10, 2013

(54) METHOD AND MOBILE DEVICE FOR TRANSMITTING AND RECEIVING PAGING MESSAGES

(75) Inventors: Gi Won Park, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 87 days.

(21) Appl. No.: 13/139,421

(22) PCT Filed: Dec. 3, 2009

(86) PCT No.: PCT/KR2009/007195
§ 371 (c)(1),
(2), (4) Date: Jun. 13, 2011

(87) PCT Pub. No.: WO2010/071312
PCT Pub. Date: Jun. 24, 2010

(65) Prior Publication Data
US 2011/0256883 A1  Oct. 20, 2011

Related U.S. Application Data

(60) Provisional application No. 61/122,412, filed on Dec. 15, 2008, provisional application No. 61/144,148, filed on Jan. 12, 2009.

(30) Foreign Application Priority Data

Mar. 18, 2009  (KR) .......................... 10-2009-0023140
Apr. 23, 2009  (KR) .......................... 10-2009-0035431

(51) Int. Cl.
*H04W 68/00* (2009.01)
*H04W 24/00* (2009.01)

(52) U.S. Cl.
USPC ........................................ 455/456.1; 455/458

(58) Field of Classification Search
USPC ............................................... 455/456.1, 458
See application file for complete search history.

(56) References Cited

U.S. PATENT DOCUMENTS

2007/0105568 A1  5/2007  Nylander et al.
2007/0149192 A1  6/2007  Kim et al.
(Continued)

FOREIGN PATENT DOCUMENTS

KR  10-2008-0045096 A  5/2008

OTHER PUBLICATIONS

Park et al., "IEEE 802.16m Heirarchical Paging Operation for efficient power management", IEEE 802.16 Broadband Wireless Access Working Group, IEEE C802.16m_08/777, Jul. 7, 2008, pp. 1-6.

(Continued)

*Primary Examiner* — William D Cumming
(74) *Attorney, Agent, or Firm* — Birch, Stewart, Kolasch & Birch, LLP

(57) ABSTRACT

A method and mobile device of performing idle mode operation carried. The method includes receiving a first paging information of a first paging group and a second paging information of a second paging group from at least one base station. Entering idle mode at a first coverage belonging to the first paging group and starting a first timer for a periodic location update. Determining a paging group of a currently preferred base station. Starting a second timer, if the paging group of the currently preferred base station is determined to be the second paging group and performing location update when the second timer expires.

16 Claims, 15 Drawing Sheets

(56) References Cited

U.S. PATENT DOCUMENTS

2011/0053617 A1* 3/2011 Lee et al. .................... 455/458
2011/0201354 A1* 8/2011 Park et al. ................. 455/456.1
2011/0256883 A1* 10/2011 Park et al. ................. 455/456.1
2011/0312338 A1* 12/2011 Park et al. ................. 455/456.1

OTHER PUBLICATIONS

Zheng et al., "Paging in Femto", IEEE C802.16m-08/1266, Oct. 31, 2008, pp. 1-6.

* cited by examiner (a)

(b)

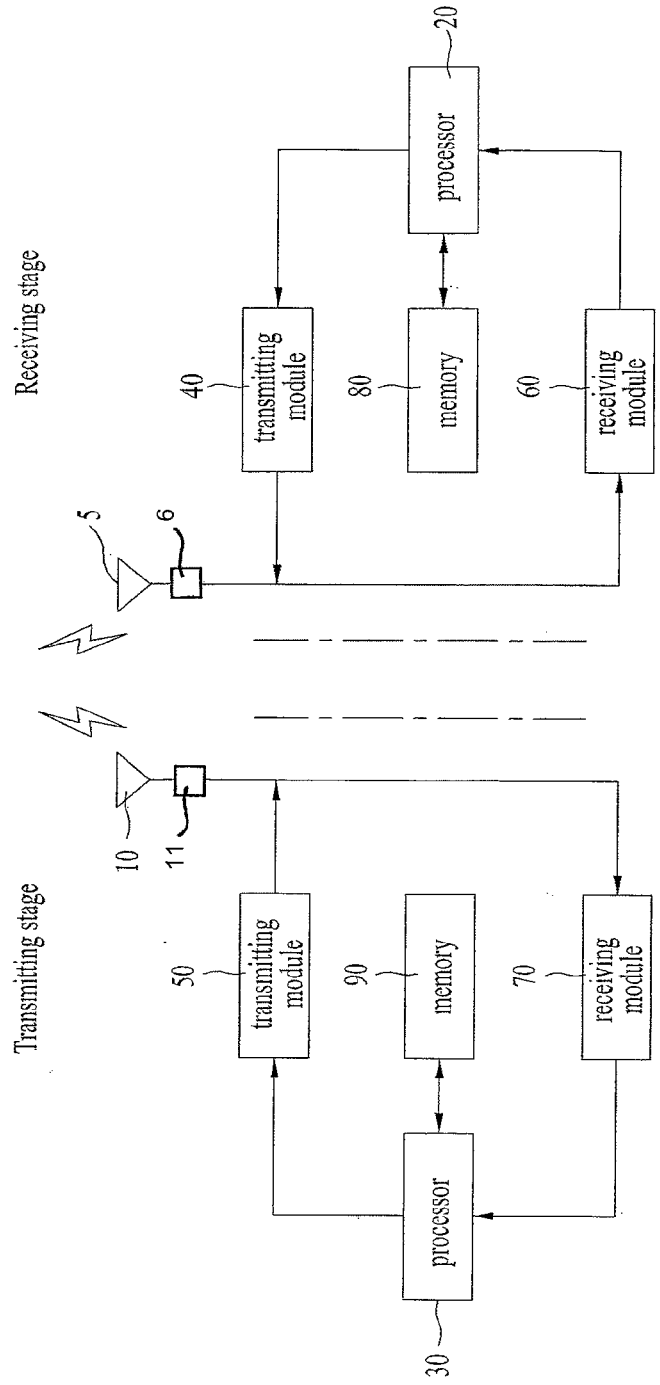

METHOD AND MOBILE DEVICE FOR TRANSMITTING AND RECEIVING PAGING MESSAGES

This application is the National Phase of PCT/KR2009/007195 filed on Dec. 3, 2009, which claims priority under 35 U.S.C. 119(e) to U.S. Provisional Application No. 61/122,412 filed on Dec. 15, 2008 and U.S. 61/144,148 filed on Jan. 12, 2009 and under 35 U.S.C. 119(a) to Korean Application No. 10-2009-0023140 filed on Mar. 18, 2009 and 10-2009-0035431 filed on Apr. 23, 2009. The entire contents of these applications are hereby incorporated by reference into the present application.

TECHNICAL FIELD

The present invention relates to a wireless access system having a femto cell applied thereto. More particularly, the present invention relates to a communication method of an idle mode mobile station in a femto cell environment.

BACKGROUND ART

In the following description, a femto cell is described in brief.

First of all, 'femto' indicates a very small unit in scale of $10^{-15}$. According to this meaning, a femto cell means an ultra small/low power indoor base station for home/office. Although a femto cell is used with a meaning similar to that of a pico cell, it can be used with the meaning of having a further evolved function. The femto cell is a small cellular base station connected to a broadband router and is able to connect voice and data of 3G system to a backbone network of a mobile communication carrier provider via DSL link and the lie as well as voice and data of the conventional 2G system.

Advantages of the above-described femto cell are described as follows.

First of all, ongoing attention is paid to the recent research report announcing that a femto cell can trigger the acceleration of the 3G propagation and the extension of an indoor coverage. The estimated number of global femto cell users will be incremented up to 102,000,000 until 1011 and the estimated number of APs (access points, i.e., base stations) will reach 32,000,000 by then.

And, a femto cell is able to reinforce a cell coverage and is also able to enhance quality of voice service. Moreover, mobile communication carriers are expected to provide services via femto cells to enable subscribers to fully adapt to 3G.

In particular, a communication system via femto cell is able to enjoy the following advantages: (1) Cell Coverage Improvement; (2) Infrastructure cost decrease; (3) New service Offering; (4) FMC (Fixed Mobile Convergence) acceleration; and the like.

At least one or more femto cells are able to configure a femto cell group in a manner of being grouped per specific service or region. For instance, a femto cell group, to which an access to a specific terminal only is granted, can be called a closed subscriber group (CSG). And, a femto base station (FBS) is able to grant an access to a terminal having subscribed to the CSG only by checking a CSG identification (CSG ID) of the terminal.

FIG. 1 is a diagram for one example of a femto cell arranged structure in an overlay network.

Referring to FIG. 1, a backbone network of a femto cell base station is directly connected to a wired ISP network. And, a femto cell gateway (FGW) can exist at a connected point with the ISP network. The FGW is able to play a role as a contact point for connecting a communication with a macro base station (MBS).

The FGW can be directly connected to femto cell base stations (FBSs) or can be situated in a concept of an integrated server between a core network and the IPS network. And, a system is able to secure the communication with a macro BS via CNS SW and ASN GW irrespective of a location of the FGW. In an overlay network, MBS is able to transmit/receive or store informations on femto base stations (FBSs) entirely or in part.

After a femto cell BS configuration has been completed, the MBS is able to recognize information including the location information of the FBS. Therefore, the MBS is able to directly perform wireless interface communication (i.e., air-interface communication) with the FBS.

In this case, a macro base station including a home femto BS and a CSG (closed subscriber group) femto base station can be called an overlay macro base station (overlay macro BS).

FIG. 2 is a diagram for one example of a femto cell arrangement structure in a non-overlay network.

In case that many users temporarily exist on adjacent boundaries of MBSs in a non-overlay structure, FBSs can be installed on a boundary of a macro cell. In this case, the MBS may not store all informations of the FBSs. If so, FGW is able to play a role as a contact point for connecting a communication with the MBS like the overlay structure.

In the following description, an idle mode of a terminal and a paging group in association with embodiments of the present are schematically explained.

First of all, an idle mode generally means the operation for helping a terminal to periodically perform a DL (downlink) broadcast traffic transmission without registering at a specific base station when the terminal moves in a radio link environment configured with multiple base stations.

In case that a terminal fails in receiving a traffic from a base station for a predetermined duration, it is able to make a transition to an idle mode to save power (i.e., for power saving). Having make the transition to the idle mode, the terminal receives a broadcast message (e.g., a paging message) transmitted by the base station and is then able to determine whether to make a transition to a normal mode or to remain in the idle mode. Moreover, the terminal in the idle mode performs a location update to inform a paging controller of its location.

The idle mode can benefit the terminal in a manner of eliminating an activation request associated with handover and general operation requests. The idle mode restricts a terminal activity to be scanned in a discrete cycle, thereby saving a power and operational resource used by the terminal.

The idle mode provides a terminal with a simple and proper scheme of announcing a pending downlink traffic. And, the idle mode is able to benefit a network and a base station in a manner of eliminating radio interface and network handover (HO) traffics from an inactive terminal.

Paging means a function of obtaining a location (e.g., a prescribed base station, a prescribed switching center, etc.) of a mobile station (MS) corresponding to an incoming call generation in a mobile communication. A plurality of base stations (BSs) capable of supporting idle mode can configure a paging region by belonging to a specific paging group.

In this case, the paging group indicates a logical group. The object of the paging group is to provide an adjacent range region, which can be paged in downlink (DL), if there is a traffic that targets a mobile station (MS). The paging group preferably meets a condition that the paging group is sufficiently big enough to enable a specific terminal to exist for most of time within the same paging group and a condition that a paging load should be sufficiently small to maintain a proper level.

A paging group is able to include at least one base station. And, one base station can be included in at least one or more paging groups. A paging group is defined by a management system. In the paging group, a paging group-action backbone network message. A paging controller manages a list of terminals in idle mode using a paging-announce message that is one of backbone network messages. And, the paging controller is able to manage the initial paging of all base stations belonging to a paging group.

In order to raise a hit ratio of paging, a terminal is able to perform a location update procedure. In this case, the location update is an operation of a terminal to raise the hit ratio of the paging to a terminal having entered an idle mode and indicates a process for a terminal to report a new location or region, which is entered by the terminal moves on moving away into a new region, to a network. Such a location update procedure can be performed in a manner that a ranging request (RNG-REQ) message and a ranging response (RNG-RSP) message are exchanged between a terminal and a base station.

DISCLOSURE OF THE INVENTION

Technical Problem

First of all, embodiments of the present invention are applicable to a case of considering a femto cell environment. If a mobile station moves away into a femto cell from a macro cell or deviates from its home femto cell region, the mobile station is able to perform a location update. In doing so, if the mobile station keeps performing the location update despite that a time for the mobile station to goes away from a femto cell region is small, the mobile station may generate an excessive location update overhead.

A mobile station is able to receive a paging message from a macro base station (MBS) and/or a femto base station (FBS) in a femto cell environment. Yet, if a mobile station receives a paging message from a macro base station in a cell region (e.g., a femto cell region) of a base station, it may increase a paging overhead more than that of a case of receiving a paging message from the femto base station.

On the contrary, in order for a mobile station to receive a paging message from a femto base station, the mobile station should perform a location update each time entering a cell region of the base station. Therefore, a location update overhead may increase.

Accordingly, the present invention is directed to an efficient communication method in a femto cell environment that substantially obviates one or more problems due to limitations and disadvantages of the related art.

An object of the present invention is to provide various methods for an idle mode mobile station to perform a location update by avoiding an excessive location update overhead.

Another object of the present invention is to provide a communication method, by which an overhead of a paging message can be reduced as well as an overhead of a location update performed by a mobile station.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

Technical Solution

To achieve these and other advantages and in accordance with the purpose of the present invention, as embodied and broadly described, the present invention relates to a wireless access system to which a femto cell is applied. Moreover, the present invention relates to various communication methods of an idle mode mobile station in a femto cell environment.

To further achieve these and other advantages and in accordance with the purpose of the present invention, a method of receiving a paging message in a femto cell environment according to one embodiment of the present invention includes the steps of receiving a deregistration command message containing at least one of a paging information, a first paging group ID of a first cell region and a second paging group ID of a second cell region from a first base station, enabling a mobile station to set a first timer for performing a location update with the first base station, enabling the mobile station to set a second timer for delaying a location update based on the first timer for a prescribed time period, and receiving the paging message (e.g., a paging advertisement message) in the second cell region.

According to one embodiment of the present invention, if the second timer expires, the mobile station is able to perform the location update in the second cell region. In this case, in the step of receiving the paging message, the paging message can be transmitted to a second base station.

Alternatively, in the step of receiving the paging message according to one embodiment of the present invention, the mobile station is able to receive the paging message from the first base station in the second cell region.

According to one embodiment of the present invention, if the first timer expires before the second timer expires, the location update can be performed in the second cell region.

According to one embodiment of the present invention, the first cell region is a macro cell region, the first paging group ID is a macro paging group ID, the second cell region is a femto cell region, and the second paging group ID can be a femto paging group ID. Alternatively, the first cell region is a femto cell region, the first paging group ID is a femto paging group identifier, the second cell region is a macro cell region, and the second paging group ID can be a macro paging group ID.

According to one embodiment of the present invention, the first paging group ID and the second paging group ID preferably have correlation in-between.

To further achieve these and other advantages and in accordance with the purpose of the present invention, a method of transmitting a paging message to a first cell region from a first base station in a femto cell environment according to another embodiment of the present invention can include the steps of receiving a deregistration request message from a mobile station, transmitting a deregistration command message containing a first paging group ID of the first cell region and a second paging group ID of a second cell region, and transmitting the paging message (e.g., a paging advertisement message) to the mobile station. In this case, if the mobile station moves away from the first cell region into the second cell region, the mobile station is able to set a first timer for delaying a location update for a prescribed time period.

According to another embodiment of the present invention, if the first base station does not receive a response message from the mobile station, the first base station is able to broadcast or transmit the paging message repeatedly as many as a prescribed count. In this case, after the first base station has transmitted the paging message as many as the prescribed count, if the first base station does not receive the response message from the mobile station, the first base station is able to transmit a report message indicating a transmission failure of the paging message to a paging controller. If the paging controller receives the report message, the paging controller is able to transmit a paging announcement message indicating a presence of the paging message to a second base station belonging to the second cell region.

According to another embodiment of the present invention, the first cell region is a macro cell region, the first paging group ID is a macro paging group ID, the second cell region is a femto cell region, and the second paging group ID can be a femto paging group ID. Alternatively, the first cell region is a femto cell region, the first paging group ID is a femto paging group identifier, the second cell region is a macro cell region, and the second paging group ID can be a macro paging group ID.

According to another embodiment of the present invention, the first paging group ID and the second paging group ID preferably have correlation in-between.

To further achieve these and other advantages and in accordance with the purpose of the present invention, in a method for a terminal to receive a paging message in a femto cell environment, a paging message receiving method according to another embodiment of the present invention includes the steps of receiving a deregistration command message containing a first paging information of a first cell region and a second paging information of a second cell region from a first base station, setting a first timer for carrying out a location update with the first base station, moving away from the first cell region into the second cell region, setting a second timer for delaying the location update for a predetermined time period, and monitoring the paging message using the first paging information and the second paging information.

In this case, the paging message receiving method is able to further include the step of if either the first timer or the second timer expires, performing the location update in the second cell region.

And, the monitoring step can be performed until the second timer expires.

Moreover, if the location update is performed due to expiration of the second timer, the mobile station receives the paging message from the second base station using the second paging information.

To further achieve these and other advantages and in accordance with the purpose of the present invention, in a method for a terminal to receive a paging message in a femto cell environment, a paging message receiving method according to another embodiment of the present invention includes the steps of receiving a deregistration command message containing a first paging information of a first cell region from a first base station, setting a first timer for performing a location update with the first base station, moving away from the first cell region into a second cell region, setting a second timer for delaying the location update for a predetermined time period, and receiving a ranging response message for performing the location update from a second base station if the second timer expires. In this case, the ranging response message contains a second paging information of the second cell region and the first paging information can be continuously retained in the mobile station after the location update has been performed.

In this case, the paging message receiving method can further include the step of receiving the paging message in the second cell using the second paging information.

And, the paging message receiving method can further include the steps of moving away into the first region from the second region, re-setting the second timer, and monitoring the paging message using the first paging information and the second paging information until the second timer expires.

Moreover, each of the paging information and the second paging information includes at least one selected from the group consisting of a paging cycle for a corresponding cell region, a paging offset, a paging listening interval, a paging group ID and a paging controller ID.

To further achieve these and other advantages and in accordance with the purpose of the present invention, in transmitting a paging message to a mobile station in a femto cell environment, a paging message transmitting method according to another embodiment of the present invention includes the steps of receiving a deregistration request message from the mobile station by a first base station, transmitting a deregistration command message containing a first paging information of a first cell region and a second paging information of a second cell region to the mobile station, and transmitting the paging message to the mobile station, wherein if the mobile station moves away from the first cell region into the second cell region, the mobile station sets a prescribed timer for delaying a location update for a predetermined time period and monitors the paging message using the first paging information and the second paging information.

In this case, the paging message transmitting method can further include the step of if a response message in response to the paging message is not received from the mobile station, transmitting a message for requesting the paging message to be transmitted to the mobile station to a second base station responsible for the second cell region.

And, the step of transmitting the message for requesting the paging message to be transmitted to the mobile station to the second base station can be performed if the response message in response to the paging message is not received after repeating the paging message transmitting step as many as a prescribed count.

Moreover, the mobile station is able to receive the paging message from the second base station using a second paging information of the second cell region.

Besides, the second paging information can be obtained by the mobile station via the deregistration command message or a ranging response (RNG-RSP) message transmitted from the second base station in the course of performing the location update.

According to the above embodiments of the present invention, the first base station is a macro base station, wherein the first cell region is a macro cell region, wherein the second base station is a femto base station, and wherein the second cell region is a femto cell region.

According to the above embodiments of the present invention, the first base station is a femto base station, wherein the first cell region is a femto cell region, wherein the second base station is a macro base station, and wherein the second cell region is a macro cell region.

To further achieve these and other advantages and in accordance with the purpose of the present invention, a mobile terminal, which is configured to perform the paging message receiving method according to the above-mentioned embodiments of the present invention, includes a processor and a radio communication (RF) module configured to transmit and receive a radio signal externally under the control of the processor, wherein the processor controls the radio communication module to receive a deregistration command message containing a first paging information of a first cell region and a second paging information of a second cell region from a first base station, wherein the processor controls the radio communication module to set a first timer for carrying out a location update with the first base station, wherein if the mobile terminal moves away from the first cell region into the second cell region, the processor controls the radio communication module to set a second timer for delaying the location update for a predetermined time period and to monitor the paging message using the first paging information and the second paging information.

In this case, if either the first timer or the second timer expires, the processor is able to control the location update to be executed in the second cell region.

And, the processor is able to control the monitoring to keep being performed until the second timer expires.

Moreover, as the second timer expires, if the location update is performed, the processor is able to control the radio communication module to receive the paging message from the second base station using the second paging information.

Advantageous Effects

Accordingly, embodiments of the present invention provide the following effects and/or advantages.

First of all, using embodiments of the present invention, a terminal and a base station are able to perform a communication efficiently in a femto cell environment.

Secondly, through embodiments of the present invention, a location update overhead and a paging overhead can be minimized.

Effects obtainable from the present invention are non-limited the above mentioned effect. And, other unmentioned effects can be clearly understood from the following description by those having ordinary skill in the technical field to which the present invention pertains.

DESCRIPTION OF DRAWINGS

FIG. 15 is a block diagram for one example of configurations of a transmitting stage and a receiving stage according to another further embodiment of the present invention.

BEST MODE FOR INVENTION

Figure 1:
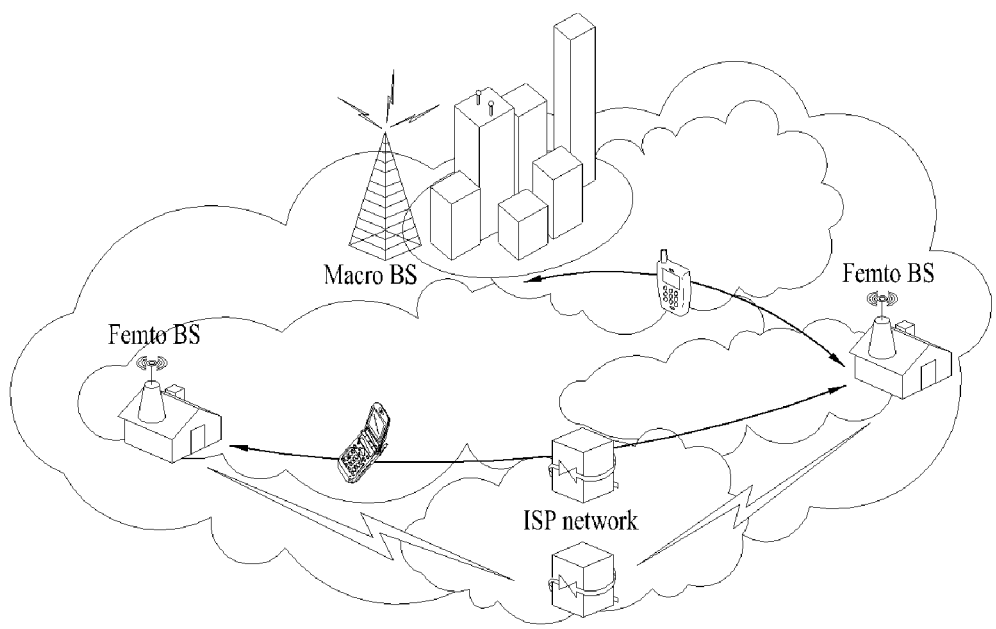
FIG. 1 is a diagram for one example of a femto cell arranged structure in an overlay network.
Figure 2:
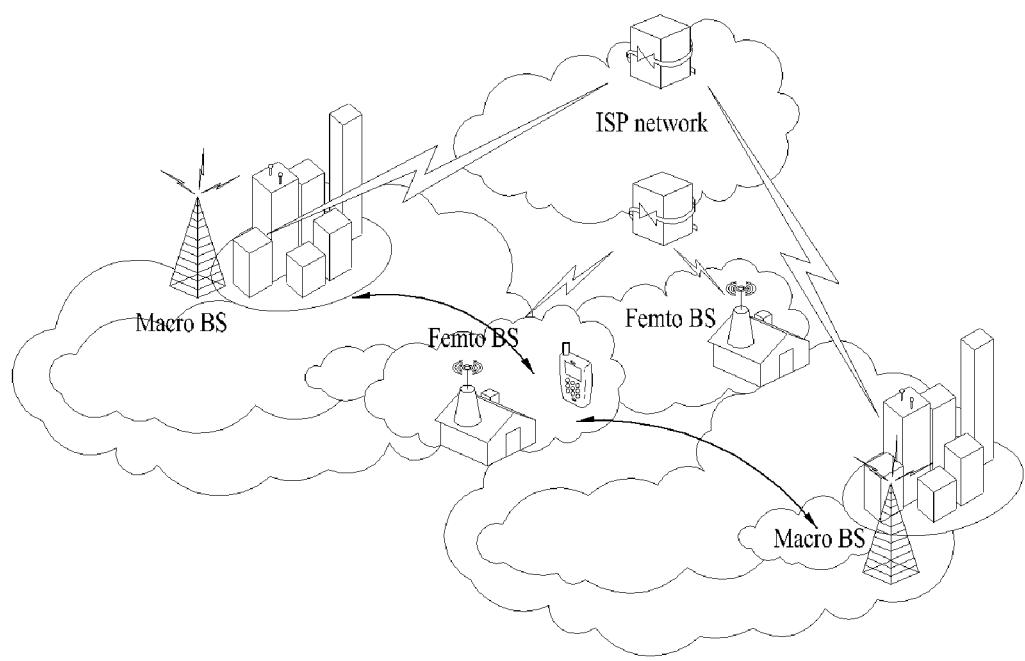
FIG. 2 is a diagram for one example of a femto cell arrangement structure in a non-overlay network.

The present invention relates to a wireless access system. In the following description, embodiments of the present invention disclose various wireless access systems to which a femto cell is applied. Moreover, embodiments of the present invention disclose various communication methods of an idle mode mobile station in a femto cell environment.

First of all, the following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment.

In the description of drawings, procedures or steps, which may ruin the substance of the present invention, are not explained. And, procedures or steps, which can be understood by those skilled in the art, are not explained as well.

In the present specification, embodiments of the present invention are described centering on the data transmission/reception relations between a base station and a mobile station. In this case, the base station is meaningful as a terminal node of a network which directly performs communication with the mobile station. In this disclosure, a specific operation explained as performed by a base station can be performed by an upper node of the base station in some cases.

In particular, in a network constructed with a plurality of network nodes including a base station, it is apparent that various operations performed for communication with a mobile station can be performed by a base station or other networks except the base station. In this case, 'base station' can be replaced by such a terminology as a fixed station, a Node B, an eNode B (eNB), an advanced base station (ABS), an access point and the like. And, 'mobile station (MS)' can be replaced by such a terminology as a user equipment (UE), a subscriber station (SS), a mobile subscriber station (MSS), an advanced mobile station (AMS), a mobile terminal, a terminal and the like.

Moreover, a transmitting stage means a stationary and/or mobile node that transmits a data service or a speech service. And, a receiving stage means a stationary and/or mobile node that receives a data service or a speech service. Hence, a mobile station can become a transmitting stage and a base station can become a receiving stage, in uplink. Likewise, a mobile station becomes a receiving stage and a base station can become a transmitting stage, in downlink.

Meanwhile, a mobile station of the present invention can include one of a PDA (personal digital assistant), a cellular phone, a PCS (personal communication service) phone, a GSM (global system for mobile) phone, a WCDMA (wideband CMDA) phone, an MBS (mobile broadband system) phone and the like.

In this case, the smart phone is the terminal having mixed advantages of a mobile communication terminal and a personal portable terminal. And, the smart phone is able to mean the terminal in which a schedule management function, a data communication function (e.g., fax transmission/reception, internet access, etc.) and the like of the personal portable terminal are integrated on the mobile communication terminal. Moreover, a multi-mode multi-band terminal means a terminal having a built-in multi-modem chip to be operable in both of a mobile Internet system and other mobile communication systems (e.g., CDMA (code division multiple access) 2000 system, WCDMA (wideband CDMA) system, etc.).

Embodiments of the present invention can be implemented using various means. For instance, embodiments of the present invention can be implemented using hardware, firmware, software and/or any combinations thereof.

In case of the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various well-known means.

Embodiments of the present invention are supportable by standard documents disclosed in at least one of wireless access systems including IEEE 802 system, 3GPP system, 3GPP LTE system and 3GPP2 system. In particular, the steps or parts, which are not explained to clearly reveal the technical idea of the present invention, in the embodiments of the present invention can be supported by the above documents. Moreover, embodiments of the present invention can be supported by at least one of P802.16-2004, P802.16e-2005, and P802.16Rev2 documents which are the standards of IEEE 802.16 system.

In the following description, a preferred embodiment of the present invention is explained in detail with reference to the accompanying drawings. Detailed description disclosed together with the accompanying drawings is intended to explain not a unique embodiment of the present invention but an exemplary embodiment of the present invention.

In the following description, specific terminologies used for embodiments of the present invention are provided to help the understanding of the present invention. And, the use of the specific terminology can be modified into another form within the scope of the technical idea of the present invention.

In the following description, one example of a procedure for a terminal to operate by entering an idle mode in a general IEEE 802.16 system is explained.

Figure 3:
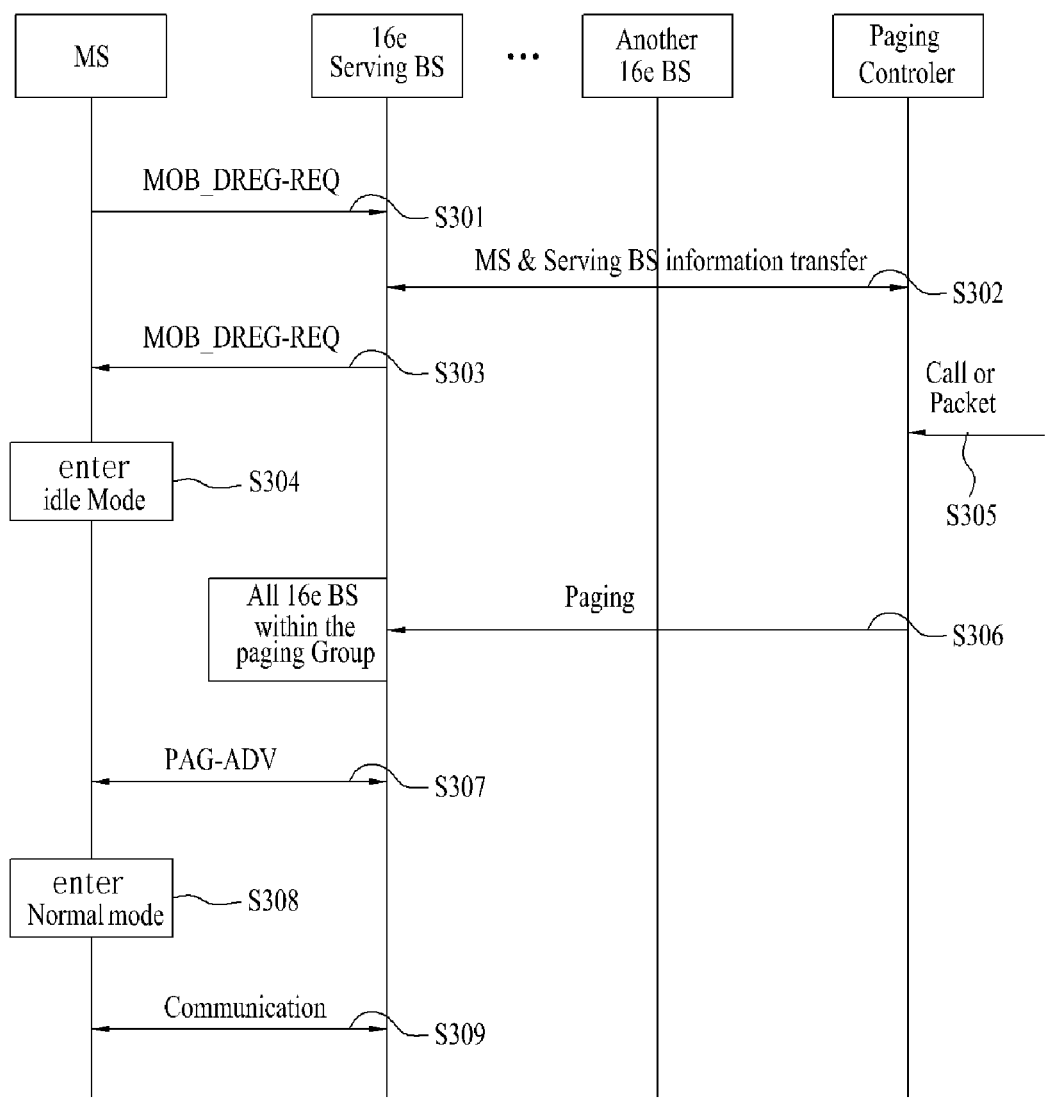
FIG. 3 is a diagram for a paging procedure in such a wireless access system as IEEE 802.16 system.

Referring to FIG. 3, first of all, in order to enter an idle mode from a normal mode, a terminal is able to send a deregistration request (hereinafter abbreviated 'DREG-REQ') message to a serving base station [S301].

Having received the DREG-REQ message is able to exchange informations on the terminal and the serving base station with a paging controller. In particular, the serving base station is able to information the paging controller of a terminal identifier of the terminal entering the idle mode and a serving base station identifier. And, the paging controller is able to inform the serving base station of a paging group ID (PGID) or a paging controller ID (PCID). The paging group ID or the paging controller ID is usable in transmitting and receiving a paging message [S302].

Subsequently, the serving base station is able to transmit a de-registration command (hereinafter abbreviated 'DREG-CMD') to the terminal. The serving base station is able to send a deregistration command (MOB_DREG-CMD) message to the terminal in response to the deregistration request message. In particular, the deregistration command message can contain a paging information. In this case, the paging information can contain parameters including a paging cycle, a paging offset, a paging listen interval and the like. And, the deregistration command message can further include the paging controller ID and the paging group ID [S303].

Having received the DREG-CMD message from the serving base station, the terminal confirms that the idle mode entry requested has been successfully granted and is then able to enter the idle mode. The terminal is able to receive a paging message based on the paging information received via the MOB_DREG-CMD message. In particular, the terminal is able to monitor a radio channel to check whether there is a paging message delivered to the terminal itself during the paging listen interval. During the rest of the time, the terminal operates in a sleep mode or Radio Turn-off to reduce its power consumption [S304].

A call for the terminal or an external packet can be inputted to the paging controller [S305].

The paging controller is able to correspondingly perform a paging procedure for searching terminals. In doing so, the paging controller is able to deliver a paging announcement message to all base stations within the paging group [S306].

Having received the paging announcement message, each of the entire base stations within the paging group is able to broadcast a paging advertisement (MOB_PAG-ADV) message to all terminals managed by the corresponding base station [S307].

Having received the paging advertisement message from the serving base station, the terminal checks the corresponding message. If the corresponding terminal is paged, it is able to enter the normal mode. The corresponding terminal is then able to perform a communication with the serving base station [S308, S309].

Figure 4:
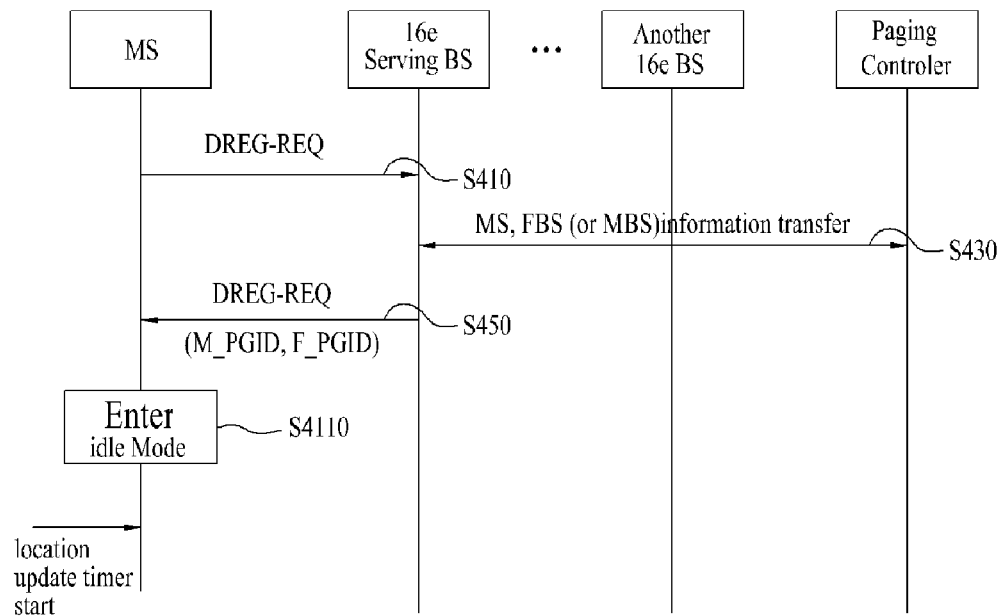
FIG. 4 is a diagram of a process for a mobile station to enter an idle mode according to one embodiment of the present invention.
Figure 4:
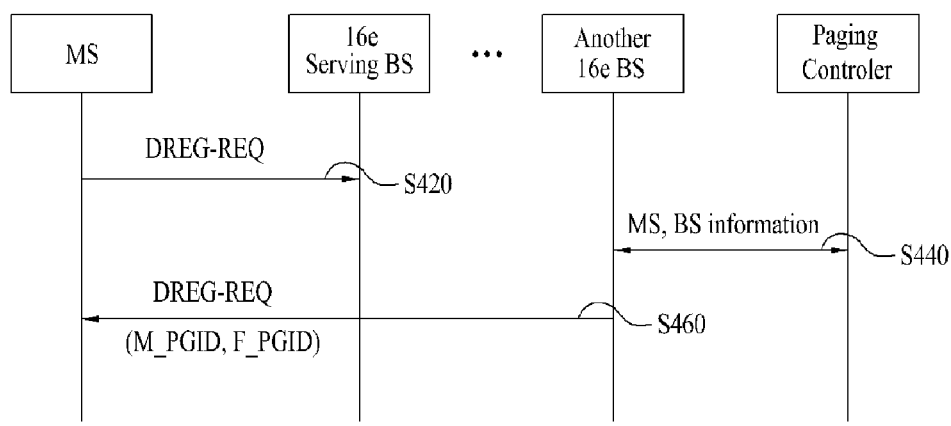

FIG. 4 is a diagram for one example of a process for a mobile station to enter an idle mode according to one embodiment of the present invention.

Referring to FIG. 4(a), in case of entering an idle mode in a femto cell, a mobile station (MS) is able to send a deregistration request (DREG-REQ) message to a femto base station (FBS) [S410].

The FMS is able to exchange at least one information on the FBS and a macro base station (MBS: Macro BS) with a paging controller (PC) [S430].

In case that the mobile station enters the idle mode in an overlay femto cell environment, the FBS is able to assign a paging ID (F_PGID) on the CSG basis, to which the femto base station belongs, to the mobile station. In doing so, femto base stations included in the same CSG group are able to use the same F_PGID. Moreover, the FBS enables correlation to be established between F_GPID and M_PGID in a manner of transmitting the paging group identifier (M_PGID) of a macro cell, to which the FBS belongs, together. The M_PGID and the F_PGID can be contained in a deregistration command message according to a format of paging information.

In this case, the paging information can contain at least one of an identifier (M_PGID: macro BS paging group ID) of a paging group to which a macro base station belongs, a paging group identifier (F_PGID: femto BS paging group ID) on a basis of CSG to which a femto base station belongs, and a CSG identifier (CSG ID) of CSG to which a mobile station subscribes.

And, the paging information can contain a paging cycle, a paging offset, a paging listening interval, a paging group ID, a paging controller ID and the like. Theses informations are set for base stations, respectively, and can have values different from each other.

The FBS is able to send a deregistration command (DREG-CMD) message containing paging information of at least one of the macro base station and the femto base station to the mobile station in response to the deregistration request message [S450].

Having received the DREG-CMD message from the femto base station (FBS) is able to enter the idle mode [S470].

FIG. 4(b) is similar to FIG. 4(a). Yet, FIG. 4(b) differs from FIG. 4(a) in that a mobile station enters an idle mode when it is in a macro base station (MBS).

Therefore, the mobile station sends a DREG-REQ message to the MBS [S420]. The MBS exchanges MS information, MBS information and/or FBS information with a paging controller (PC) [S440]. And, the MBS is able to send a DREG-CMD message containing at least one of paging information, M_PGID and F_PGID to the mobile station [S460].

If the paging information (containing F_PGID) of the FBS is not transmitted via the DREG-CMD message, the mobile station is able to obtain the paging information of the FBS via a ranging response (RNG-RSP) message transmitted from the FBS when a location update is performed. This shall be described in detail later.

Table 1 in the following shows one example of a deregistration command message, which is usable when a macro base station delivers its paging information and paging information of FBS to a mobile station, according to embodiments of the present invention.

TABLE 1

| Syntax | Size (bit) | Notes |
|---|---|---|
| MOB_DREG-CMD_Message_format( ) { | — | — |
| ~ | | |
| Macro BS Paging information | | |
| { | | |
| Macro BS PG ID | | M_PGID |
| Paging cycle | | |
| Paging offset | | |
| Paging listening interval | | |
| }//End of Macro BS Paging information | | |
| The number of MS's CSG in overlay macro BS | | |
| For(i=0; i< The number of MS's CSG; i++) | | |
| { | | |
| Paging information | | |
| { | | |
| MS's CSG femto BS PG ID | | F_PGID |
| Paging cycle | | |
| Paging offset | | |
| Paging listening interval | | |
| } | | |

TABLE 1-continued

| Syntax | Size (bit) | Notes |
|---|---|---|
| }//End of for(the number of MS's CSG) | | |
| ~ | | |
| } //End of MOB_DREG-CMD | | |

Referring to Table 1, it can be observed that a paging information of a macro base station and a paging information of a femto base station can be contained in a DREG-CMD message in a manner of being discriminated from each other.

As mentioned in the foregoing description, the paging information of the MBS and the paging information of the FBS can be obtained by a mobile station through a DREG-CMD message or can be obtained by a mobile station through a ranging response message in the course of performing a location update.

Table 2 in the following shows one example that a paging information of MBS and a paging information of FBS are contained in a ranging response message received by a mobile station from the MBS when the mobile station performs a location update in an MBS region.

TABLE 2

| Syntax | Size (bit) | Notes |
|---|---|---|
| MOB_RNG-RSP_Message_format( ) { | — | — |
| ~ | | |
| Macro BS Paging information | | |
| { | | |
| Macro BS PG ID | | |
| Paging cycle | | |
| Paging offset | | |
| Paging listening interval | | |
| }//End of Macro BS Paging information | | |
| The number of MS's CSG in overlay macro BS | | |
| For(i=0; i< The number of MS's CSG; i++) | | |
| { | | |
| Paging information | | |
| { | | |
| MS's CSG femto BS PG ID | | |
| Paging cycle | | |
| Paging offset | | |
| Paging listening interval | | |
| } | | |
| }//End of for(the number of MS's CSG) | | |
| ~ | | |
| } //End of MOB_RNG-RSP | | |

Referring to Table 2, a paging information on MBS (macron BS paging information) and paging information of FBS belonging to CSG (MS's CSG in overlay macro BS), to which a mobile station has subscribed, in a state overlaid with the MBS can be respectively included.

According to embodiments of the present invention, M_PGID and F_PGID can have correlation in-between, which can mean that a mobile station may not perform a location update despite moving across regions having different paging group identifiers if a prescribed condition is met.

In the following description, a location update procedure usable for embodiments of the present invention is explained in detail.

First of all, a mobile station in an idle mode is able to perform a location update on various start conditions. A mobile station is able to perform such a location update as a timer based location update, a paging group location update, a power-down location update, a MAC hash skip threshold update and the like.

For instance, if a location update timer retained by one of a mobile station (MS), a macro base station (MBS) and a femto base station (FBS) expires, the mobile station is able to performer a timer based location update. And, a mobile station is able to perform a paging group location update if its paging group is changed. Moreover, a mobile station is able to perform a power-down update before its power is turned off.

A mobile station is able to perform a location update if a femto base station defined in the embodiments of the present invention is changed. And, a mobile station is able to perform a location update in case of changing a femto paging group (FPG) including at least one or more femto base stations.

A mobile station in an idle mode is able to perform a location update in case of moving away into a femto base station from a macro base station, moving away into a macro base station from a femto base station, or getting out of a femto cell region.

Figure 5:
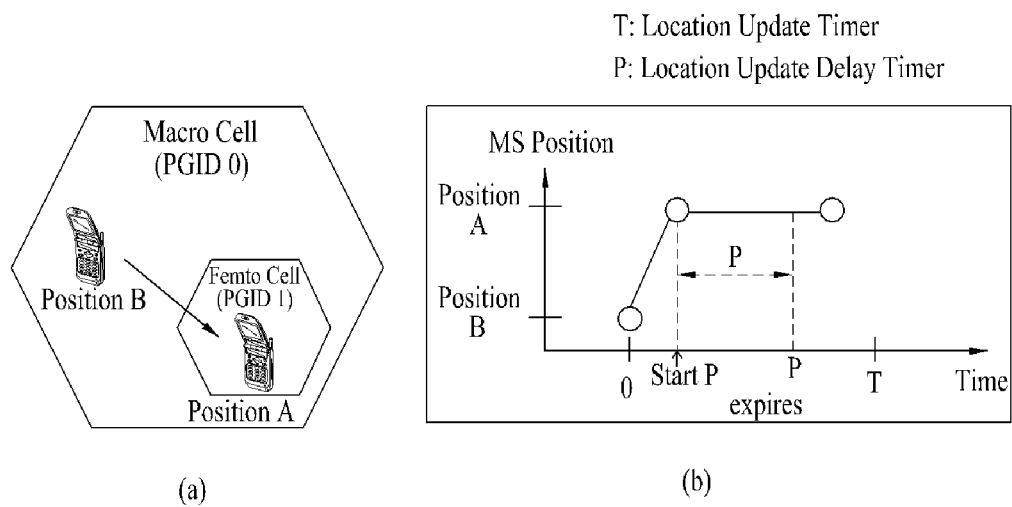
FIG. 5 is a diagram for one example of a method for a mobile station to perform a location update according to another embodiment of the present invention.

FIG. 5 is a diagram for one example of a method for a mobile station to perform a location update according to another embodiment of the present invention.

FIG. 5 shows a case that a mobile station enters an idle mode in a macro cell region of a macro base station (MBS). In this case, FIG. 5(a) shows a case that an idle mode MS is moving away into a home femto cell region from a macro cell region. According to embodiments of the present invention, F_PGID based on CSG of a femto base station is set to PGID 1 and M_PGID of a macro base station can be set to PGID 0. In this case, assume that the PGID 1 and the PGID 0 have correlation in-between.

A mobile station is able to move away into a position A in a femto cell from a position B in a macro cell. In doing so, since the mobile station has moved away into a region having a different paging group identifier, it should perform a location update. Yet, if a mobile station moves away into a paging group having the correlation described with reference to FIG. 4, it does not perform a location update but sets a location update delay timer (hereinafter named 'timer P') to prevent an excessive location update procedure from being performed. In this case, 'setting a timer' means that a measurement of an elapse timer is initiated in a stat that a counter of the timer is reset.

Referring to FIG. 5(b), when a mobile station enters an idle mode, it is able to set a location update timer (hereinafter named 'timer T'). Thereafter, when the mobile station has moved away into a position A from a position B having correlation to the position A, the mobile station is able to set the timer P. If the timer P of the mobile station expires at the position A, the mobile station is able to perform a location update with a femto base station (FBS).

In FIG. 5, if a mobile station performs a location update, all the timers (i.e., timer T, timer P) can be updated. Moreover, when the mobile station has moved away into a different paging region (e.g., PGID 2, PGID 3, etc.) instead of PGID 0 before the expiration of the timer P, it is able to perform a location update in accordance with a paging group change.

Yet, if a paging message is sent to a mobile station in an interval from a point of setting and activating the timer P to an expiring point of the timer P, the demand for a method for the mobile station to reliably receive the paging message is rising.

In the following description, a method for a mobile station to reliably receive a paging message is explained in a manner of being divided into the following cases of: 1) receiving both a paging information of a serving base station and a paging information on a different base station overlaid with the serving station from the serving base station on entering an idle mode; and 2) receiving a paging information of a serving base station only from the serving base station on entering an idle mode.

Figure 6:
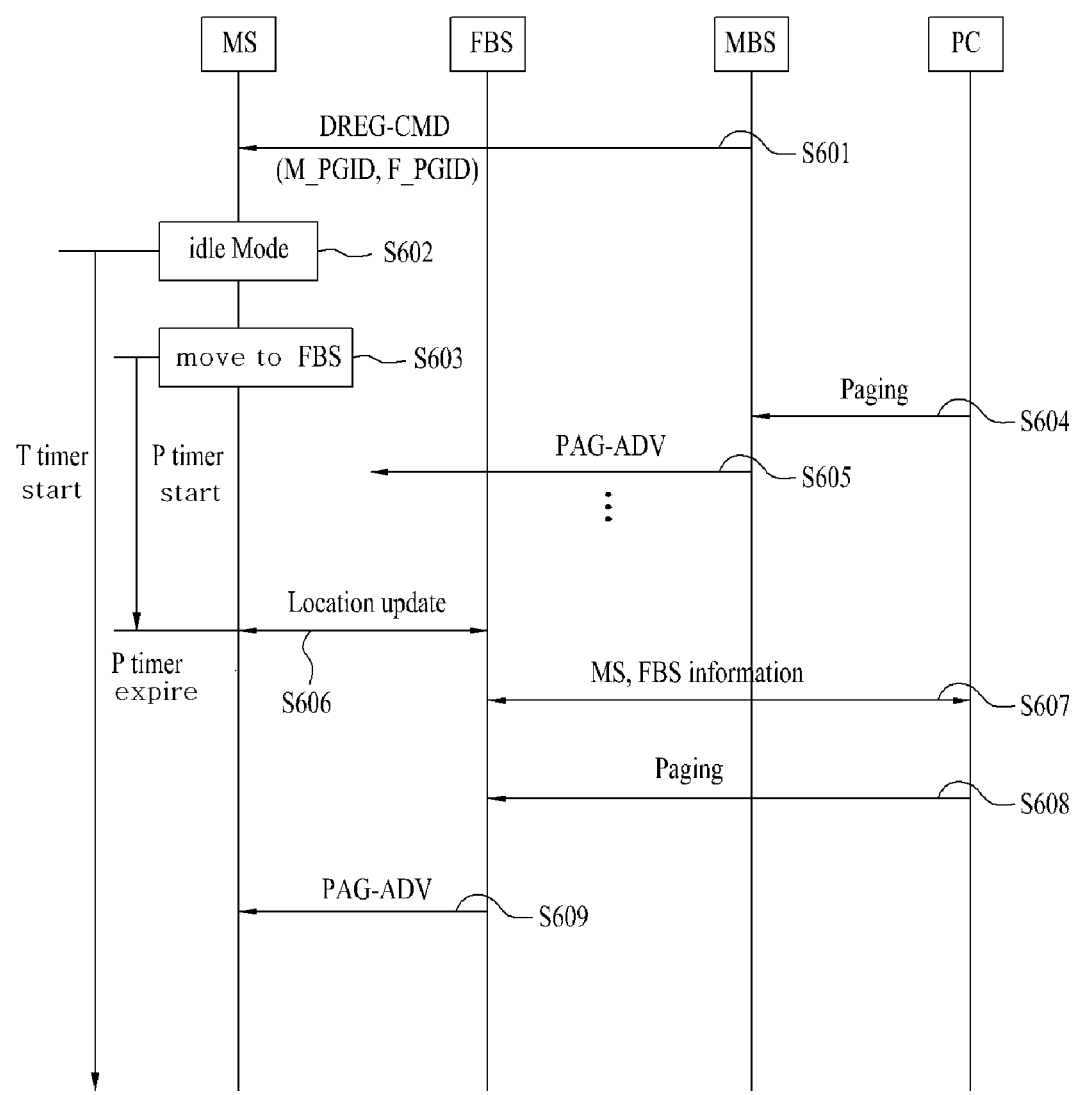
FIG. 6 is a diagram for one example of a method of transmitting a paging message reliably to a mobile station in a femto cell environment according to another embodiment of the present invention.

(1) Case for a Mobile Station to Receive Both a Paging Information of a Serving Base Station and a Paging Information on a Different Base Station Overlaid with the Serving Station Via a Deregistration Command Message FIG. 6 is a diagram for one example of a method of transmitting a paging message reliably to a mobile station in a femto cell environment according to another embodiment of the present invention.

In FIG. 6, assume a case that a mobile station enters an idle mode in a macro base station (MBS) region. Therefore, the mobile station is able to receive a deregistration command (DREG-CMD) message containing a paging information of MBS and a paging information of FBS from the MBS [S601].

Having received the DREG-CMD message, the mobile station is able to enter an idle mode. In this case, after the mobile station has entered the idle mode, it is able to set a location update timer (e.g., timer T) [S602].

In the idle mode state, the mobile station is able to move across cell regions. According to an embodiment of the present invention, the mobile station is able to move away into FBS cell region from MBS cell region. In doing so, the mobile station does not perform a location update but is able to reduce an excessive location update overhead by setting a timer P [S603].

In case that a traffic or call toward the mobile station in the idle mode is generated, a paging controller (PC) is able to send a paging message to a macro base station or a femto base station. In doing so, the PC is able to preferentially send a paging announcement message to the MBS in which the mobile station has entered the idle mode [S604].

If the MBS receives the paging announcement message from the PC, it is able to broadcast a paging advertisement (PAG-ADV) message. In this case, the mobile station is able to receive the paging advertisement message having broadcasted by the MBS in the FBS cell region [S605].

As the time for the mobile station to stay in the femto cell region increases, the timer P may expire. If so, the mobile station is able to perform a location update with the FBS [S606].

Accordingly, the FBS is able to share the MS information and the FBS information with the PC [S607].

If a traffic or call toward the mobile station is generated, the PC is able to send a paging announcement message not to the MBS but to the FBS [S608].

If the FBS receives the paging message from the PC, it broadcasts a paging advertisement (PAG-ADV) message to its FBS cell region or is able to send a paging advertisement message to a specific mobile station by unicasting [S609].

Figure 7:
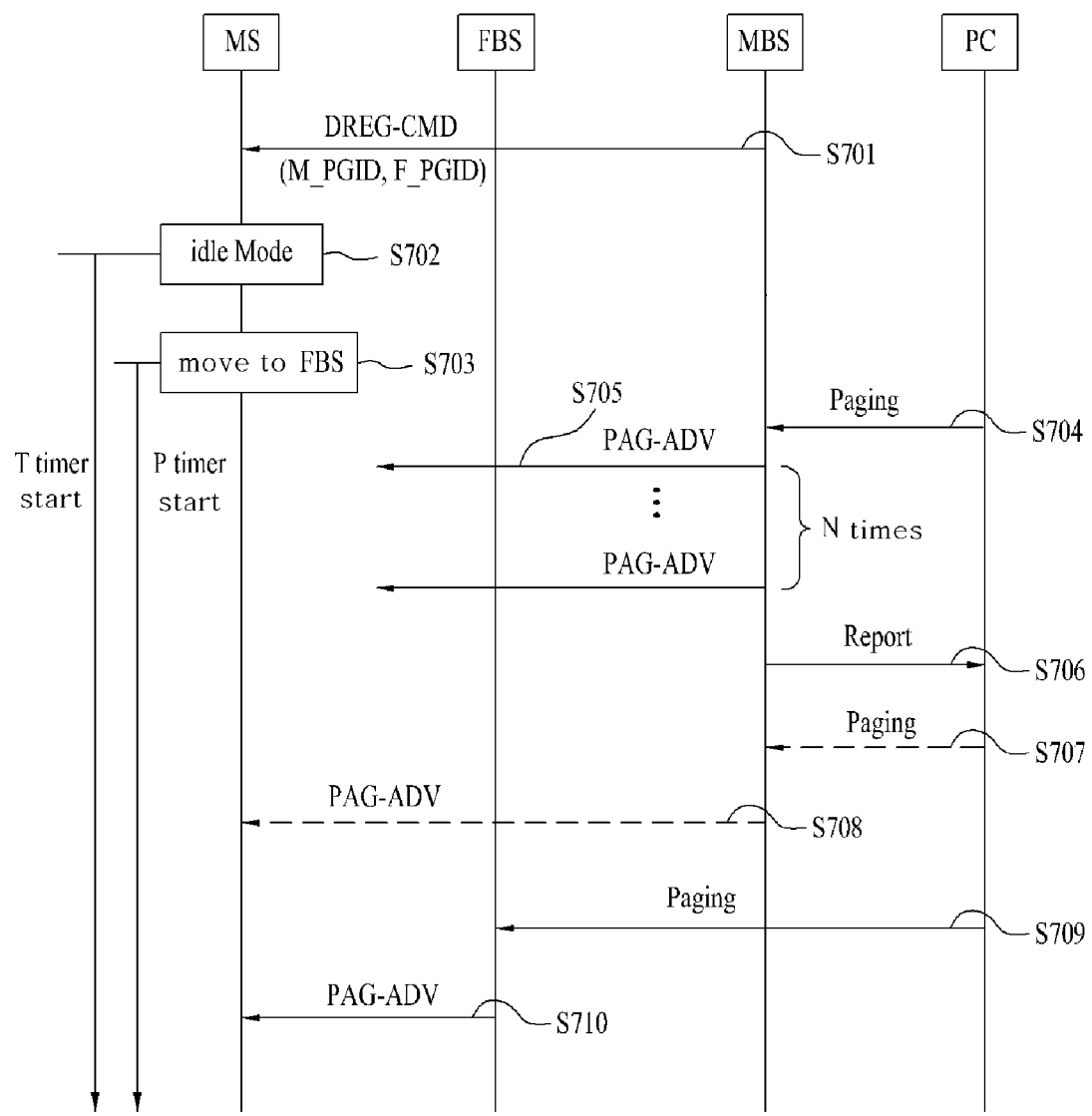
FIG. 7 is a diagram for another example of a method of transmitting a paging message reliably to a mobile station in a femto cell environment according to another embodiment of the present invention.

FIG. 7 is a diagram for another example of a method of transmitting a paging message reliably to a mobile station in a femto cell environment according to another embodiment of the present invention.

First of all, the following steps S701 to S704 shown in FIG. 7 are similar to the former steps S601 to S604 in FIG. 6. Hence, the descriptions for the steps S701 to S704 can refer to the former descriptions with reference to FIG. 6.

Referring to FIG. 7, MBS is able to broadcast a paging advertisement (PAG-ADV) message to its cell region. If there is no response from a mobile station, the MBS is able to repeatedly broadcast the paging advertisement (PAG-ADV) messages as many as a prescribed count (e.g., N times) [S705].

After the MBS has broadcasted the paging advertisement messages by N times, if there is no response from the mobile station, the MBS is able to send a report message for reporting such a fact to a paging controller (PC). In this case, the report message can contain at least one of an information related to the MBS, an information related to the mobile station, an information on FBS belonging to the MBS and an information related to a paging count [S706].

Having received the report message from the macro base station, the paging controller is able to send a paging message to at least one of the MBS and the FBS. Yet, since the paging fails in the cell region of the MBS in FIG. 7, the PC preferably sends a paging announcement message to the FBS [S709].

Since the FBS has received the paging announcement message from the PC, it is able to send a paging advertisement (PAG-ADV) message to its cell region by broadcasting or unicasting [S710].

Yet, while sending the paging message to the FBS selectively, the PC is able to re-send the paging announcement message to the MBS as well [S707].

In this case, since the MBS has received the paging announcement message from the PC, it is able to broadcast a paging advertisement message to the mobile station [S708].

Unlike the method described with reference to FIG. 7, after the paging advertisement message has been sent by N times in the step S705, if there is still no response from the mobile station, the MBS is able to cancel the connection with the corresponding mobile station.

Figure 8:
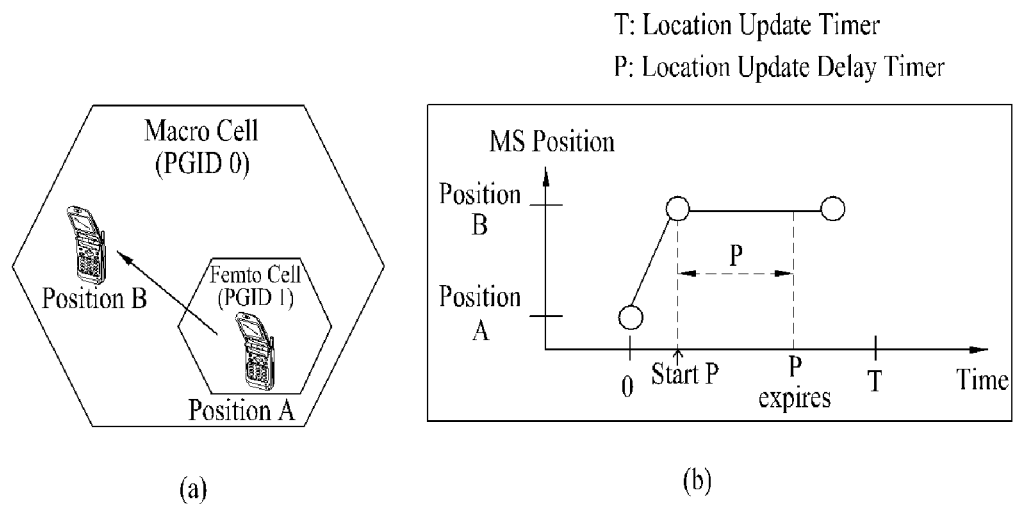
FIG. 8 is a diagram for another example of a method for a mobile station to perform a location update according to another embodiment of the present invention.

FIG. 8 is a diagram for another example of a method for a mobile station to perform a location update according to another embodiment of the present invention.

FIG. 8 shows a case that a mobile station enters an idle mode in a femto cell region. In this case, FIG. 8(a) shows a case that an idle mode mobile station (MS) is able to move away from a home femto cell region into a macro cell region. According to embodiments of the present invention, F_PGID based on CSG of a femto base station is set to PGID 1 and M_PGID of a macro base station can be set to PGID 0. In this case, assume that the PGID 1 and the PGID 0 have correlation in-between.

A mobile station is able to move away from a position A in a femto cell into a position B in a macro cell. In doing so, since the mobile station has moved away into a region having a different paging group identifier, it should perform a location update. Yet, if a mobile station moves away into a paging group having the correlation described with reference to FIG. 4, it does not perform a location update but sets a location update delay timer (i.e., 'timer P') to prevent an excessive location update procedure from being performed.

Referring to FIG. 8(b), when a mobile station enters an idle mode, it is able to set a location update timer (i.e., 'timer T'). Thereafter, when the mobile station has moved away into a position A from a position B having correlation to the position A, the mobile station is able to set the timer P. If the timer P of the mobile station expires at the position B, the mobile station is able to perform a location update with a macro base station (MBS).

In FIG. 8, if a mobile station performs a location update, all the timers (i.e., timer T, timer P) can be updated. Moreover, when the mobile station has moved away into a different paging region (e.g., PGID 2, PGID 3, etc.) instead of PGID 1 before the expiration of the timer P, it is able to perform a location update in accordance with a paging group change.

Figure 9:
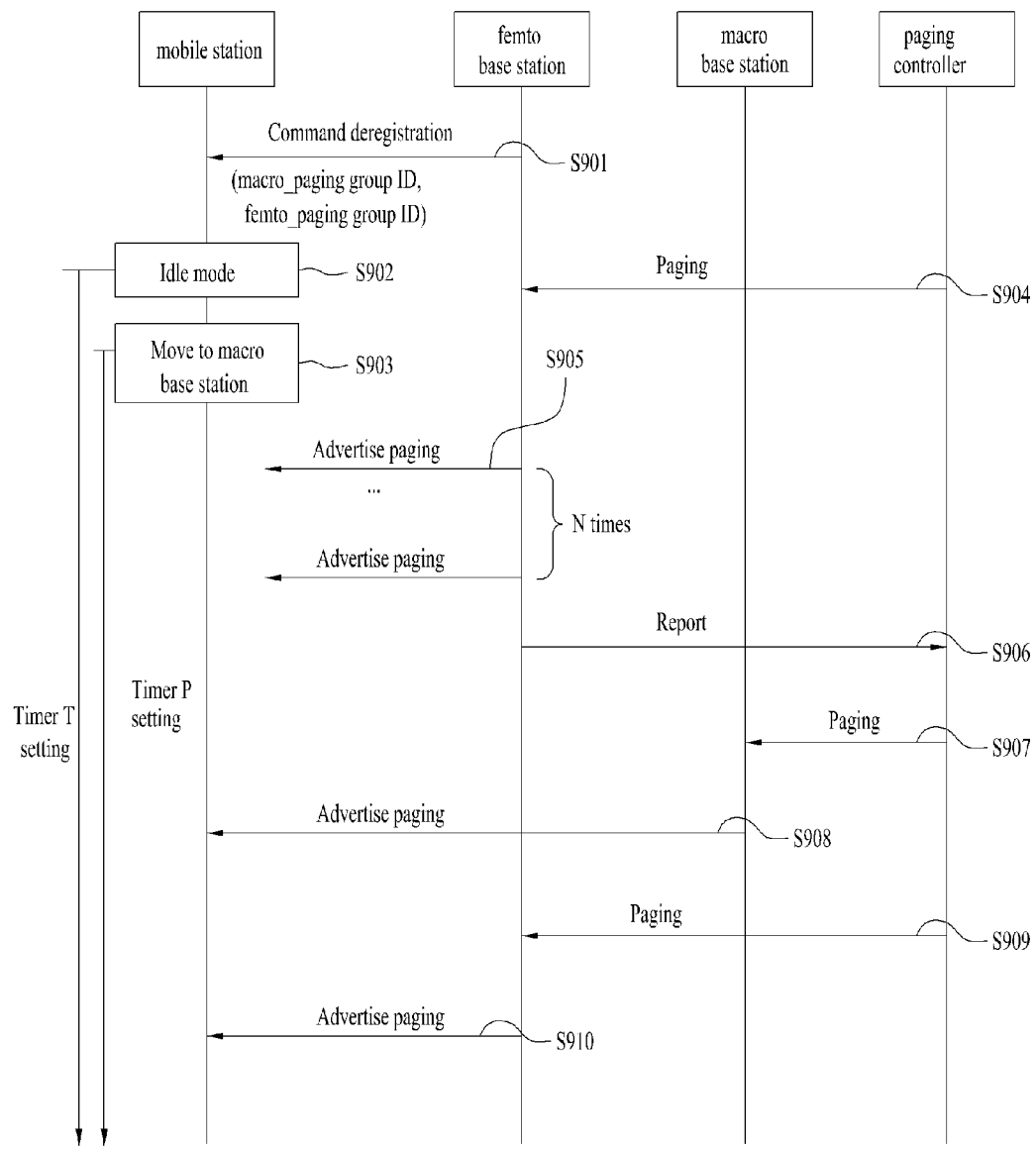
FIG. 9 is a diagram for one example of a method of transmitting a paging message reliably to a mobile station in a femto cell environment according to another embodiment of the present invention.

FIG. 9 is a diagram for one example of a method of transmitting a paging message reliably to a mobile station in a femto cell environment according to another embodiment of the present invention.

FIG. 9 is a diagram for one example of a method of transmitting a paging message to a mobile station in a femto cell environment according to another embodiment of the present invention.

In FIG. 9, assume a case that a mobile station enters an idle mode in a femto base station (FBS). Therefore, the mobile station is able to receive a deregistration command (DREG-CMD) message containing M_PGID, F_PGID and a paging information from the FBS [S901].

Having received the DREG-CMD message, the mobile station is able to enter an idle mode. In this case, after the mobile station has entered the idle mode, it is able to set a location update timer (e.g., timer T) [S902].

In the idle mode state, the mobile station is able to move across cell regions. According to an embodiment of the present invention, the mobile station is able to move away from FBS cell region into MBS cell region. In doing so, when the mobile station moves between cell regions having correlation in-between, the mobile station does not perform a location update but is able to reduce an excessive location update overhead by setting a timer P [S903].

In case that a traffic or call toward the mobile station in the idle mode is generated, a paging controller (PC) is able to send a paging message to a macro base station or a femto base station. In doing so, the PC is able to preferentially send a paging announcement message to the FBS in which the mobile station has entered the idle mode [S904].

The FBS is able to broadcast a paging advertisement (PAG-ADV) message to its cell region. Thereafter, if there is no response from the mobile station, the FBS is able to repeatedly broadcast a paging advertisement (PAG-ADV) message as many as a prescribed count (e.g., N times) to the femto cell region [S905].

The mobile station is able to monitor the paging advertisement message based on the paging information contained in the deregistration command message in the step S901. Therefore, the mobile station may not receive the paging advertisement message broadcasted or sent by the FBS.

After the FBS has broadcasted the paging advertisement messages by N times, if there is no response from the mobile station, the FBS is able to send a report message for reporting such a fact to a paging controller (PC). In this case, the report message can contain at least one of an information related to the FBS, an information related to the mobile station, an information on MBS, to which the FBS belongings, and an information related to a paging count [S906].

Having received the report message from the FBS, the paging controller is able to send a paging message to at least one of the MBS and the FBS.

Yet, since the paging fails in the cell region of the FBS in FIG. 9, the PC preferably sends a paging announcement message to the MBS [S907].

Since the MBS has received the paging announcement message from the PC, it is able to send a paging advertisement (PAG-ADV) message to its cell region by broadcasting or unicasting [S908].

After the mobile station has moved into the cell region of the MBS, if the mobile station is unable to catch a downlink synchronization information of the FBS, it is able to match a downlink synchronization with the MBS. Having matched the downlink synchronization with the MBS, the mobile station is able to receive the PAG-ADV message sent by the MBS using the paging information allocated from the MBS. Yet, in case that the mobile station matches the synchronization with the FBS in the MBS region as well, the mobile station is able to receive the paging advertisement message from the FBS in the MBS region using the paging information allocated from the FBS.

In FIG. 9, while sending the paging message to the MBS selectively, the PC is able to re-send the paging announcement message to the FBS as well [S909].

In this case, since the FBS has received the paging announcement message from the PC, it is able to broadcast a paging advertisement message to the mobile station [S910].

If the timer P expires in FIG. 9, the mobile station is able to perform a location update with the MBS. In this case, the mobile station is able to receive the paging message from the MBS.

Unlike the method described with reference to FIG. 9, after the paging advertisement message has been sent by N times in the step S905, if there is still no response from the mobile station, the MBS is able to cancel the connection with the corresponding mobile station.

Meanwhile, if there is no reply from the mobile station in response to the paging advertisement (PAG-ADV) message broadcasted by the MBS to its cell region in the step S705 described with reference to FIG. 7, the MBS is able to directly make a request for the FBS to deliver the paging advertisement message to the mobile station. This is described with reference to FIG. 10 as follows.

Figure 10:
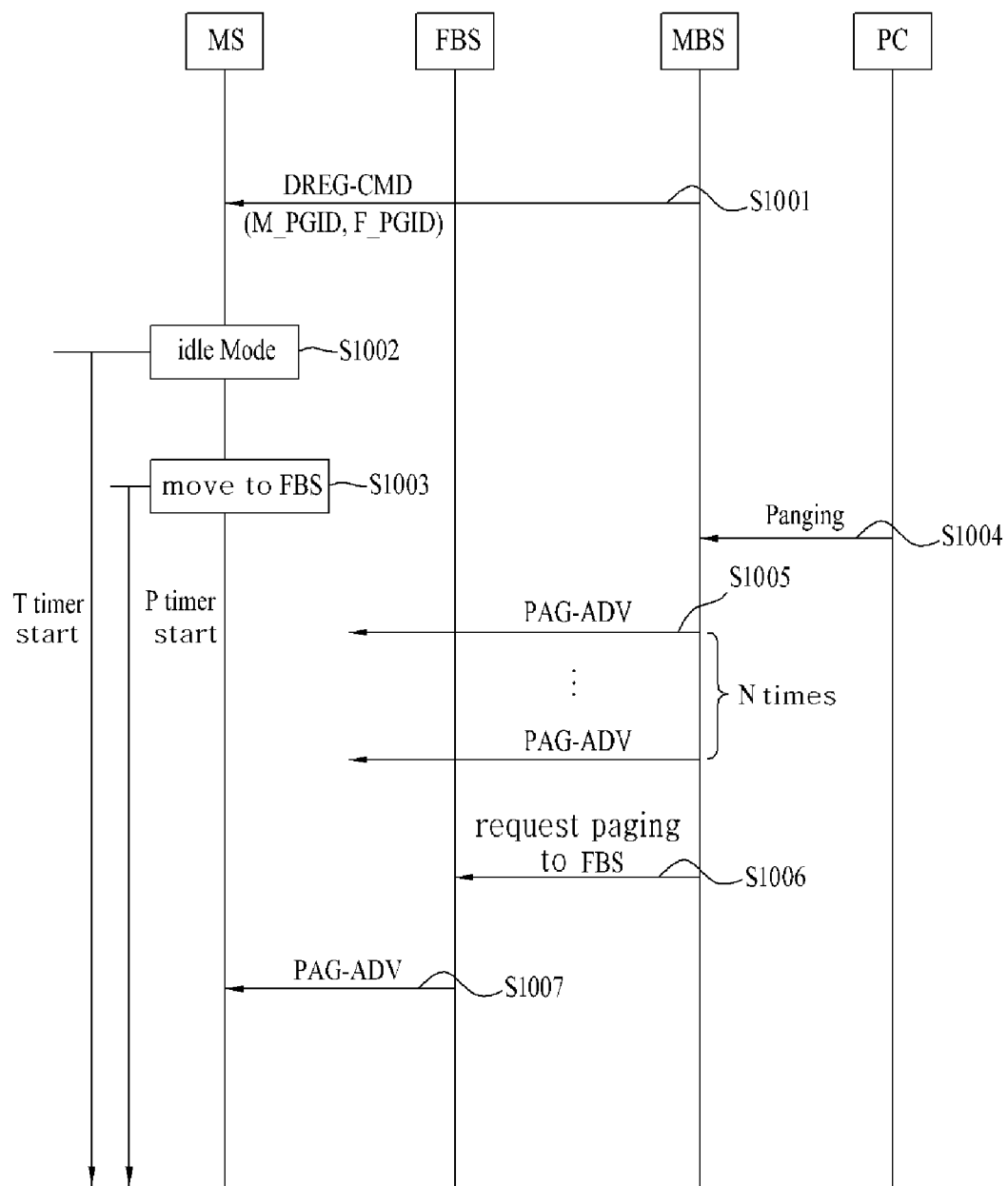
FIG. 10 is a diagram for another example of a method of transmitting a paging message reliably to a terminal in a femto cell environment according to another embodiment of the present invention.

FIG. 10 is a diagram for another example of a method of transmitting a paging message reliably to a terminal in a femto cell environment according to another embodiment of the present invention.

The following steps S1001 to S1005 in FIG. 10 are similar to the former steps S701 to S705 in FIG. 7. Therefore, the descriptions for the steps S1001 to S1005 shall refer to the former descriptions with reference to FIG. 6 and FIG. 7.

Referring to FIG. 10, if there is no reply from a mobile station in response to a paging advertisement (PAG-ADV) message broadcasted by MBS to its cell region, the MBS is able to directly send a message, which requests FBS to deliver the paging advertisement message to the mobile station, to the FBS [S1006].

In this case, the request message sent to the FBS from the MBS contains at least one of an information related to the MBS, an information related to the mobile station, an information on the FBS belonging to the MBS, an information related to a paging count, and paging informations.

If the FBS receives the request message, the FBS is able to send a paging advertisement (PAG-ADV) message to its cell region by broadcasting or unicasting using the informations contained in the request message [S1007].

Yet, as mentioned in the foregoing description, the mobile station preferably receives a paging message from the FBS as well as the MBS until a location update is performed due to the expiration of the timer P. For this, during an interval of the timer P, the mobile station preferably monitors a paging message (PAG-ADV) during an interval for delivering each of the paging messages of the two base stations using the MBS and FBS paging informations acquired from the MBS via the deregistration command message. This is described with reference to FIG. 11 as follows.

Figure 11:
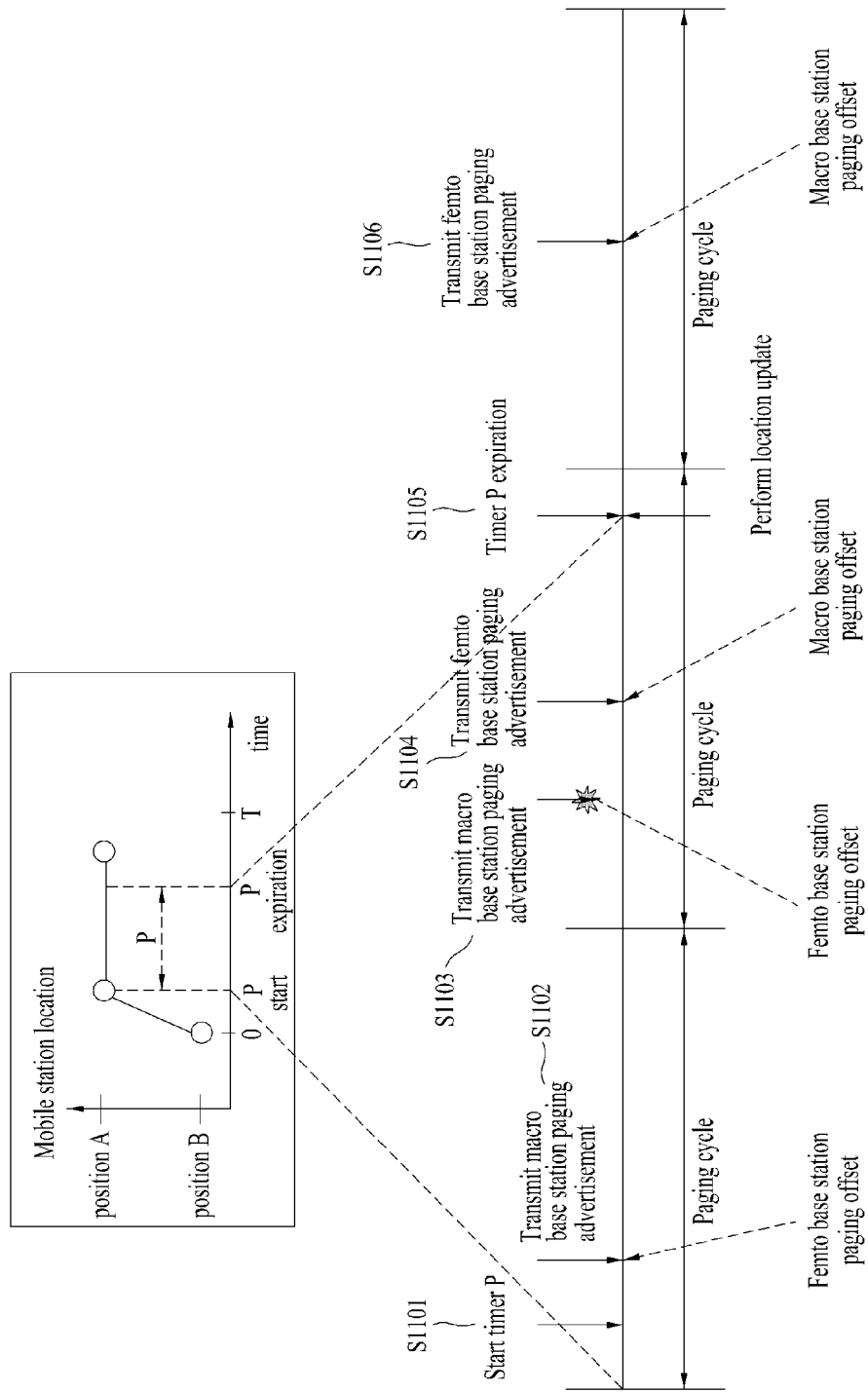
FIG. 11 is a diagram for another example of a method of transmitting a paging message reliably to a terminal in a femto cell environment according to another embodiment of the present invention.

FIG. 11 is a diagram for another example of a method of transmitting a paging message reliably to a terminal in a femto cell environment according to another embodiment of the present invention.

In FIG. 11, assume that a mobile station enters an idle mode in MBS region (e.g., position B) and then moves into FBS region (e.g., position A, femto cell). And, assume that a paging offset of MBS is different from that of FBS despite that a paging cycle of the MBS is equal to that of the FBS.

If a mobile station moves away into FBS region from MBS region, it is able to set a timer P [S1101].

After the mobile station has moved into the FBS region, the mobile station is able to receive a paging message (PAG-ADV) broadcasted by the MBS in a paging offset of the MBS of a first paging cycle. In this case, it is not necessary for the mobile station to receive a paging message broadcasted from the FBS [S1102].

Yet, while moving in a femto cell, the mobile station may not receive the paging message broadcasted from the MBS in a specific region of the femto cell. Therefore, the mobile station is unable to transmit a response to the paging message to the MBS [S1103].

As the MBS does not receive the response message to the paging message from the mobile station, it is able to send a report message, which indicates the transmission failure of the paging message for the mobile station, to the paging controller (PC). Therefore, the PC enables the FBS to send a paging message to the mobile station. Moreover, the MBS is able to send a message, which requests the FBS to send the paging message to the mobile station, to the FBS directly by bypassing the paging controller.

Therefore, the FBS is able to send the paging message to the mobile station in its paging offset. If so, the mobile station is able to receive the paging message by monitoring the paging message broadcasted from the FBS in the paging offset of the femto cell using the femto cell paging information obtained on entering the idle mode and is then able to receive the corresponding paging message [S1104].

If the mobile station keeps staying in the femto cell after the expiration of the timer P, the mobile station is able to perform a location update to the FBS [S1105].

Thereafter, the mobile station is able to receive the paging message from the FBS. Therefore, as the FBS sends the paging message to the mobile station only, a paging overhead can be minimized.

Figure 12:
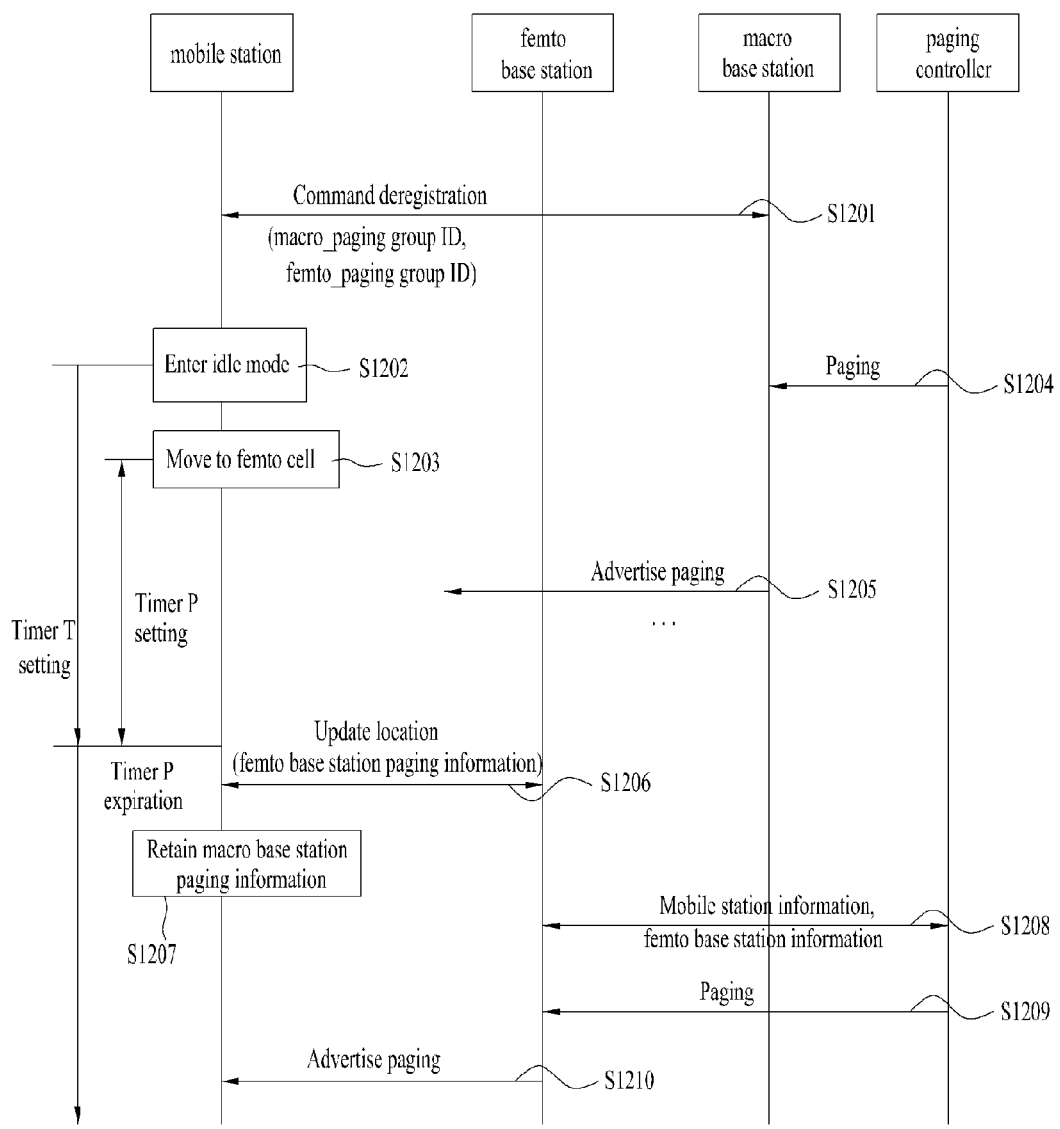
FIG. 12 shows one example of a method for a terminal to receive a paging message reliably according to a further embodiment of the present invention.

(2) Case for a Mobile Station to Receive a Paging Information of a Serving Base Station Only Via a Deregistration Command Message FIG. 12 shows one example of a method for a terminal to receive a paging message reliably according to a further embodiment of the present invention.

In FIG. 12, assume a case that a mobile station enters an idle mode in a macro base station (MBS). Therefore, the mobile station is able to receive a deregistration command (DREG-CMD) message containing a paging information of the MBS from the MBS [S1201].

Having received the DREG-CMD message, the mobile station is able to enter an idle mode. In this case, after the mobile station has entered the idle mode, it is able to set a location update timer (e.g., timer T) [S1202].

In the idle mode state, the mobile station is able to move across cell regions. According to an embodiment of the present invention, the mobile station is able to move away into FBS cell region from MBS cell region. In doing so, the mobile station does not perform a location update but is able to reduce an excessive location update overhead by setting a timer P [S1203].

In case that a traffic or call toward the mobile station in the idle mode is generated, a paging controller (PC) is able to send a paging message to a macro base station or a femto base station. In doing so, the PC is able to preferentially send a paging announcement message to the MBS in which the mobile station has entered the idle mode [S1204].

If the MBS receives the paging announcement message from the PC, it is able to broadcast a paging advertisement (PAG-ADV) message to the mobile station. In this case, the mobile station is able to receive the paging advertisement message having broadcasted by the MBS in the FBS cell region [S1205].

As the time for the mobile station to stay in the femto cell region increases, the timer P may expire. If so, the mobile station is able to perform a location update with the FBS. In particular, a procedure of the location update can be performed in a following manner. First of all, the mobile station sends a ranging request (RNG-REQ) message to the FBS. Secondly, the FBS sends a ranging response (RNG-RSP) message to the mobile station in response to the ranging request message. In this case, a paging information of the FBS can be contained in the ranging response message. Occasionally, a paging information of the MBS overlaid with the FBS itself can be additionally contained in the ranging response message [S1206].

Even if the mobile station obtains the paging information of the FBS by performing the location update, it is preferable that the mobile station keeps retaining the MBS paging information obtained in the step S1001. Yet, if the paging information of the MBS is re-obtained in the step S1006, the paging information of the MBS is updated and then retained [S1207].

In this case, the paging information of the MBS can be deleted from the mobile station after expiration of at least one paging cycle or a prescribed timer from the location update (S1006).

As the mobile station has performed the location update, the FBS is able to share the mobile station information and the FBS information with the PC [S1208].

Moreover, if a traffic or call toward the mobile station is generated, the PC is able to send a paging announcement message not to the MBS but to the FBS [S1209].

If the FBS receives the paging message from the PC, the FBS broadcasts a paging advertisement (PAG-ADV) message to its FBS cell region or is able to send a paging advertisement message to a specific mobile station by unicasting. In this case, the mobile station is able to receive the paging advertisement message from the FBS using the FBS paging information obtained in the step S1006 [S1210].

Meanwhile, if the mobile station gets out of the femto cell and then moves into the MBS region again after the step S1009, the timer P is rest. And, the femto base station shall not perform the location update in the MBS region before the expiration of the timer P. if the timer P does not expire yet, the femto base station will not perform the location update in the MBS region. If the mobile station keeps moving, it becomes distant from the FBS. As a result, the mobile station is unable to receive the paging message from the FBS any more. And, the corresponding operations of the mobile station and base stations are described with reference to FIG. 13 as follows.

Figure 13:
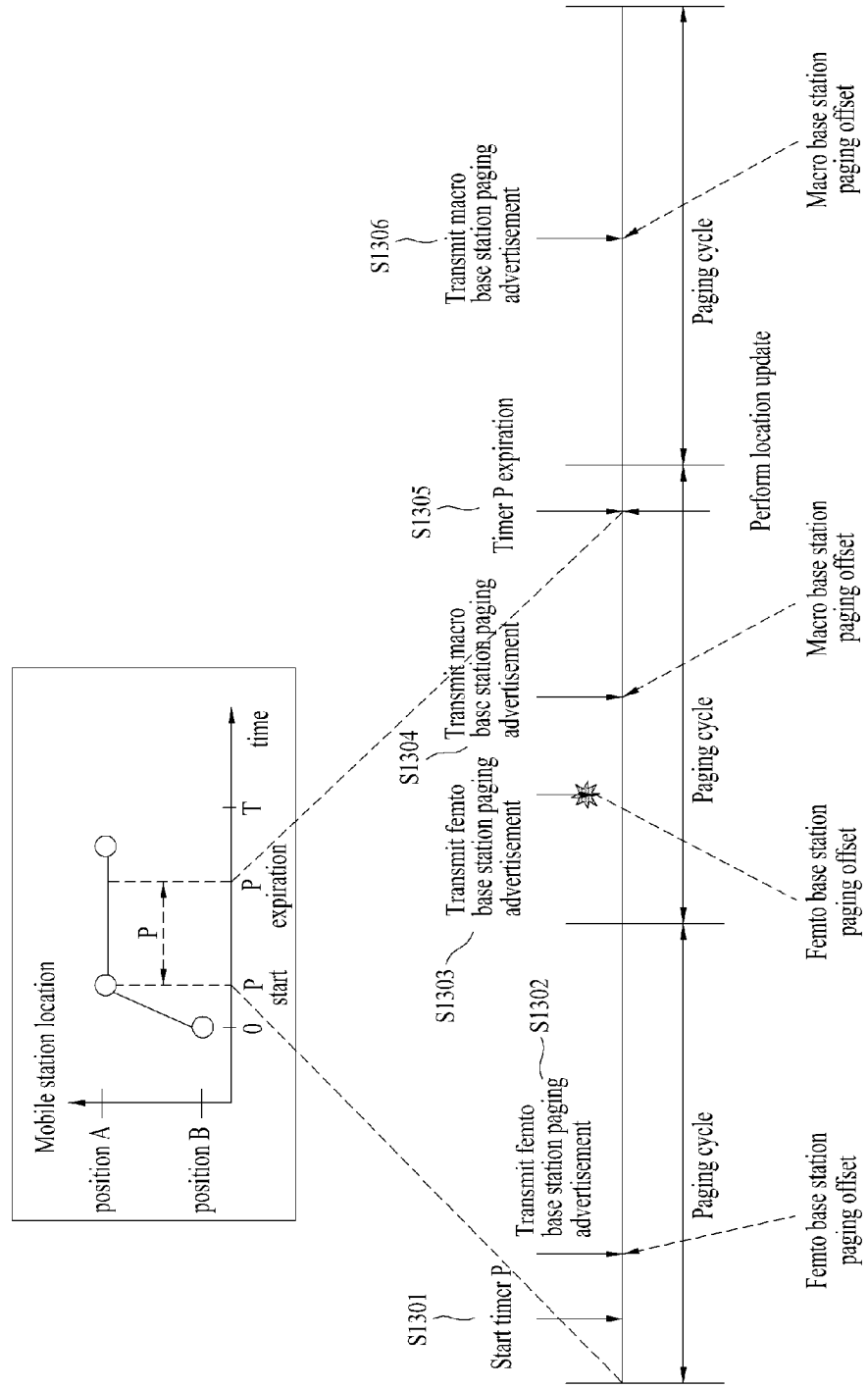
FIG. 13 shows another example of a method for a terminal to receive a paging message reliably according to a further embodiment of the present invention.

FIG. 13 shows another example of a method for a terminal to receive a paging message reliably according to a further embodiment of the present invention.

In FIG. 13, assume that a mobile station performs the steps up to the step S1209 shown in FIG. 12 and then moves away into MBS region (position B) from FBS region (position A, femto cell). And, assume that a paging offset of MBS is different from that of FBS despite that a paging cycle of the MBS is equal to that of the FBS.

If a mobile station moves away into MFBS region from FBS region, it is able to set a timer P [S1301].

After the mobile station has moved into the MBS region, the mobile station is able to receive a paging message (PAG-ADV) broadcasted or unicasted by the FBS in a paging offset of the FBS of a first paging cycle. In this case, it is not necessary for the mobile station to receive a paging message broadcasted from the MBS [S1302].

Yet, as the mobile station keeps moving in the MBS region, it becomes further distant from the femto cell. Therefore, the mobile station may not further receive the paging message broadcasted from the FBS in a paging offset of the FBS. Accordingly, the mobile station is unable to transmit a response to the paging message to the FBS [S1303].

As the FBS does not receive the response message to the paging message from the mobile station, it is able to send a report message, which indicates the transmission failure of the paging message for the mobile station, to the paging controller (PC). Therefore, the PC enables the MBS to send a paging message to the mobile station. Moreover, the FBS is able to send a message, which requests the MBS to send the paging message to the mobile station, to the FBS directly by bypassing the paging controller.

Therefore, the MBS is able to send the paging message to the mobile station in its paging offset. If so, the mobile station is able to receive the paging message by monitoring the paging message broadcasted from the MBS in the paging offset of the MBS using the MBS paging information obtained on entering the idle mode and is then able to receive the corresponding paging message [S1304].

If the mobile station keeps staying in the MBS region after the expiration of the timer P, the mobile station is able to perform a location update to the MBS [S1305].

Thereafter, the mobile station is able to receive the paging message from the MBS. Therefore, as the MBS sends the paging message to the mobile station only, a paging overhead can be minimized.

Although the descriptions for the embodiments of the present invention are mainly focused on the case that the mobile station enters the idle mode in the MBS region and then moves away into the femto cell, it is a mater of course that the embodiments of the present invention are applicable to a case that a mobile station enters an idle mode in a femto cell and then moves away into an MBS region.

For instance, Table 1 shows an example of a paging information format contained in a deregistration command (DREG-CMD) message. And, Table 2 shows an example of a paging information format contained in a ranging response (RNG-RSP) message. Moreover, Table 1 or Table 2 is applicable to a case that a mobile station receives the messages from FBS as well as MBS. Of course, in this case, a paging information of the corresponding FBS itself will be contained in a paging information of the FBS only.

Figure 14:
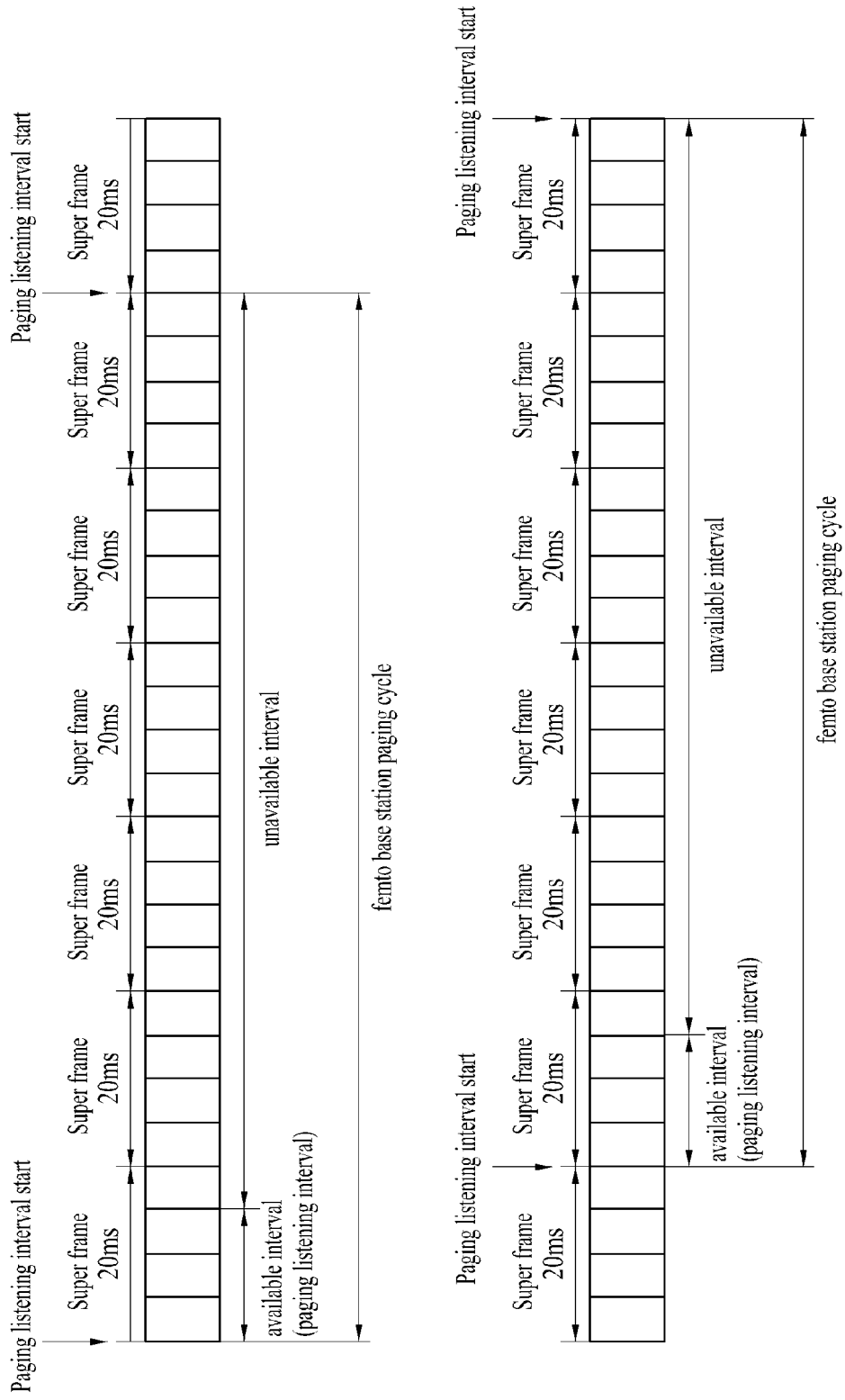
FIG. 14 is a diagram for one example of a paging cycles of femto and macro base stations usable for embodiments of the present invention.

FIG. 14 is a diagram for one example of a paging cycles of femto and macro base stations usable for embodiments of the present invention.

A single super frame can have a cycle of 20 ms. A single super frame can have 4 frames. In FIG. 14, 3 frames can be set as a paging available interval or a paging listening interval. In this case, 6 super frames can be set as a single femto base station (BS) paging cycle and a macro base station (BS) paging cycle. Mobile stations in a cell region of a femto base station or a cell region of a macro base station can receive a paging message in a paging available interval of each of the cell regions.

According to further embodiment of the present invention, a mobile station and base stations (FBS, MBS) capable of implementing the above mentioned embodiments of the present invention are explained in the following description.

First of all, a mobile station works as a transmitter in uplink and is able to work as a receiver in downlink. A base station works as a receiver in uplink and is able to work as a transmitter in downlink. In particular, each of the mobile station and the base station can include a transmitter and a receiver for transmission of information and/or data.

Each of the transmitter and the receiver can include a processor, a module, a part and/or a means for performing embodiments of the present invention. In particular, each of the transmitter and the receiver can include a module (means)

for encrypting a message, a module for interpreting the encrypted message, an antenna for transceiving the message and the like. Examples of such a transmitting stage and a receiving stage are described with reference to FIG. 15 as follows.

FIG. 15 is a block diagram for one example of configurations of a transmitting stage and a receiving stage according to another further embodiment of the present invention.

Referring to FIG. 15, a left part indicates a structure of a transmitting stage and a right part indicates a structure of a receiving stage. Each of the transmitting and receiving stages can include an antenna 5/10, a transmitting module (Tx module) 40/50, a receiving module (Rx module) 60/70, and a memory 80/90. In particular, each of the components can perform a corresponding function. The components are explained in detail as follows.

The antenna 5/10 externally transmits a signal generated from the transmitting module 40/50. And, the antenna 5/10 receives a radio signal from outside and then delivers the received radio signal to the receiving module 60/70. In case that a multi-antenna (MIMO) function is supported, at least two antennas can be provided.

Moreover, the antenna, the transmitting module and the receiving module can configure into a single radio communication (RF) module (40 and 60, 50 and 70).

The processor 20/30 generally controls overall operations of the transmitting or receiving stage. In particular, the processor 20/30 is able to perform a control function for performing the above-described embodiments of the present invention, a MAC (medium access control) frame variable control function according to service characteristics and propagation environment, a handover function, an authentication function, an encryption function and the like.

In particular, the processor of a mobile terminal receives a deregistration command message containing at least one of a paging information of a femto cell and a paging information of a macro cell from a macro base station in a femto cell environment by controlling the radio communication module and is able to set a timer T for performing a location update with the macro base station. Thereafter, if the mobile terminal moves away into a femto cell region from a macro cell region, the processor sets a timer P for delaying a location update during a prescribed period and is able to control overall operations of the mobile terminal for monitoring a paging message using the paging informations of the macro and femto cell paging informations.

Moreover, if either the timer T or the timer P expires, the processor is able to control the location update to be executed in the femto cell region.

If the location update is performed due to the expiration of the timer P, the processor is able to control a paging message to be received from the femto base station using the paging information of the femto cell. Besides, the processor of the mobile terminal is able to control the above-mentioned operations performed by the mobile terminal overall.

The processor of the base station analyzes MAC message or data transmitted from a mobile station and then allocates a necessary uplink resource to the mobile station. The processor of the base station generates an uplink grant and the like to inform the mobile station of the details of the allocation and is then able to perform a scheduling for transmitting the generated uplink grant and the like.

The transmitting module 40/50 performs prescribed coding and modulation on a signal and/or data, which is scheduled by the processor and will be then transmitted externally, and is then able to deliver the coded and modulated signal and/or data to the antenna 10.

The receiving module 60/70 reconstructs the radio signal received externally via the antenna 00/10 into original data in a manner of performing decoding and demodulation on the received radio signal and is then able to deliver the reconstructed original data to the processor 20/30.

The memory 80/90 can store programs for processing and control of the processor and is able to perform a function of temporarily storing input/output data (e.g., sleep mode information according to reference synchronization information, etc.). And, the memory 80/90 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

And, the base station performs a controller function for performing the above-described embodiments of the present invention, an OFDMA (orthogonal frequency division multiple access) packet scheduling, TDD (time division duplex) packet scheduling and channel multiplexing function, a MAC (medium access control) frame variable control function according to a service characteristic and propagation environment, a fast traffic real-time control function, a handover function, an authentication and encryption function, a packet modulation/demodulation function for data transmission, a fast packet channel coding function, a real-time modem control function, and the like, using at least one of the above-mentioned modules. Alternatively, the base station can further include separate means, modules, parts and/or the like for performing these functions.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. It is apparent that an embodiment can be configured by combining claims, which are not explicitly cited in-between, together without departing from the spirit and scope of 'what is claimed is' or that those claims can be included as new claims by revision after filing an application.

Industrial Applicability

Accordingly, the present invention is applicable to various wireless access systems. And, 3GPP ($3^{rd}$ generation partnership project), 3 GPP2 and/or IEEE 802.xx (institute of electrical and electronic engineers 802) system and the like are examples for the various wireless access systems. Embodiments of the present invention are applicable to all technical fields having the various wireless access systems applied thereto as well as the various wireless access systems.

What is claimed is:

1. A method of performing idle mode operation carried out by a mobile station, the method comprising,
  receiving a first paging information of a first paging group and a second paging information of a second paging group from at least one base station;
  entering idle mode at a first coverage belonging to the first paging group and starting a first timer for a periodic location update;
  determining a paging group of a currently preferred base station;

starting a second timer, if the paging group of the currently preferred base station is determined to be the second paging group; and performing location update when the second timer expires.

2. The method of claim 1, wherein if the second timer has not expired, the periodic location update is not performed while the mobile station is in a second coverage belonging to the second paging group, regardless of expiration of the first timer.

3. The method of claim 1, wherein the determination of the paging group comprises receiving a message including a paging group identifier of the currently preferred base station.

4. The method of claim 1, wherein when the location update due to the expiration of the second timer is performed, both the first timer and the second timer are reset.

5. The method of claim 1, further comprising receiving a paging message by using the second paging information, while the mobile station is in a second coverage belonging to the second paging group.

6. The method of claim 1, wherein each of the first paging information and the second paging information comprise at least one of a paging cycle, paging offset, paging listening interval, paging group identifier and paging controller identifier.

7. The method of claim 2, wherein the first coverage comprises at least one macro base station and the second coverage comprises at least one femto base station.

8. The method of claim 2, further comprising resetting the second timer if the mobile station returns to the first coverage from the second coverage before the expiration of the second timer.

9. A mobile station for performing idle mode operation, the mobile station comprising:

a processor; and a radio communication (RF) module configured to transceive a radio signal externally under the control of the processor, wherein the processor is configured to:

receive a first paging information of a first paging group and a second paging information of a second paging group from at least one base station;

enter idle mode at a first coverage belonging to the first paging group and starting a first timer for a periodic location update;

determine a paging group of a currently preferred base station;

start a second timer, if the paging group of the currently preferred base station is determined to be the second paging group; and perform location update when the second timer expires.

10. The mobile station of claim 9, wherein if the second timer has not expired, the processor control the periodic location update not to be performed while the mobile station is in a second coverage belonging to the second paging group, regardless of expiration of the first timer.

11. The mobile station of claim 9, wherein the processor determines the paging group of the currently preferred base station by receiving a message including a paging group identifier of the currently preferred base station.

12. The mobile station of claim 9, wherein when the location update due to the expiration of the second timer is performed, the processor resets both the first timer and the second timer.

13. The mobile station of claim 9, wherein the processor is further configured to receive a paging message by using the second paging information, while the mobile station is in a second coverage belonging to the second paging group.

14. The mobile station of claim 9, wherein each of the first paging information and the second paging information comprise at least one of a paging cycle, paging offset, paging listening interval, paging group identifier and paging controller identifier.

15. The mobile station of claim 10, wherein the first coverage comprises at least one macro base station and the second coverage comprises at least one femto base station.

16. The mobile station of claim 10, wherein the processor is further configured to reset the second timer if the mobile station returns to the first coverage from the second coverage before the expiration of the second timer.

* * * * *